(12) United States Patent
Kim

(10) Patent No.: US 9,075,239 B2
(45) Date of Patent: Jul. 7, 2015

(54) OPTICAL SYSTEM FOR FORMING OPTICAL PATH OF OBLIQUE ANGLE AND METHOD THEREOF

(76) Inventor: Woo Jun Kim, Gyeonggi-do (KR)

( * ) Notice: Subject to any disclaimer, the term of this patent is extended or adjusted under 35 U.S.C. 154(b) by 0 days.

(21) Appl. No.: 13/584,951

(22) Filed: Aug. 14, 2012

(65) Prior Publication Data

US 2013/0003173 A1     Jan. 3, 2013

Related U.S. Application Data

(63) Continuation of application No. PCT/KR2011/001076, filed on Feb. 18, 2011.

(30) Foreign Application Priority Data

Feb. 19, 2010    (KR) .......................... 10-2010-0015030
Jan. 24, 2011    (KR) .......................... 10-2011-0006799

(51) Int. Cl.
*G02B 21/06*      (2006.01)
*G02B 21/22*      (2006.01)
*G02B 17/02*      (2006.01)
*G02B 26/08*      (2006.01)

(52) U.S. Cl.
CPC .............. *G02B 21/22* (2013.01); *G02B 17/023* (2013.01); *G02B 26/0883* (2013.01)

(58) Field of Classification Search
CPC ... G02B 21/22; G02B 17/023; G02B 26/0883
USPC ................................................ 359/368–398
See application file for complete search history.

(56) References Cited

U.S. PATENT DOCUMENTS

| | | | | |
|---|---|---|---|---|
| 3,417,685 A | * | 12/1968 | Kato et al. | 396/432 |
| 3,475,075 A | * | 10/1969 | Stone, Jr. | 359/384 |
| RE29,194 E | * | 4/1977 | Ambrose et al. | 355/43 |
| 4,822,974 A | | 4/1989 | Leighton | |
| 5,009,487 A | * | 4/1991 | Reiner | 359/376 |
| 5,162,641 A | | 11/1992 | Fountain | |

(Continued)

FOREIGN PATENT DOCUMENTS

| CN | 1067573 A | 1/1993 |
|---|---|---|
| CN | 2917913 Y | 7/2007 |

(Continued)

OTHER PUBLICATIONS

International Search Report, PCT/KR2011/001076, WIPO, Jan. 14, 2012.

(Continued)

*Primary Examiner* — Frank Font
(74) *Attorney, Agent, or Firm* — Park & Associates IP Law, P.C.

(57) ABSTRACT

An optical system is used in a microscope which is provided to observe a sample or in a light emitting device which applies a beam of light such as a laser beam onto a sample. The optical system can form an oblique path of light so that without shifting the sample or the position of the eyes of the observer (or the position of a light source of the light emitting device), the observer can observe (in the case of the light emitting device, it can apply light onto) not only a vertical top side the sample but also a front, rear, left or right side of the sample, or the position of a portion of the sample to be observed (in the case of the light emitting device, a portion onto which light is applied) can be varied.

11 Claims, 22 Drawing Sheets

(56) References Cited

U.S. PATENT DOCUMENTS

| | | | |
|---|---|---|---|
| 5,886,812 A * | 3/1999 | Volk | 359/368 |
| 6,459,530 B2 * | 10/2002 | Nanba et al. | 359/365 |
| 8,000,004 B2 * | 8/2011 | Kuster | 359/388 |
| 8,009,352 B2 * | 8/2011 | Soon | 359/388 |
| 8,208,201 B2 * | 6/2012 | Truman et al. | 359/368 |
| 8,270,071 B2 * | 9/2012 | Glaser et al. | 359/373 |
| 8,638,495 B2 * | 1/2014 | Truman et al. | 359/368 |
| 2002/0080481 A1 * | 6/2002 | Tachihara et al. | 359/434 |
| 2003/0043459 A1 * | 3/2003 | Matsui | 359/386 |
| 2005/0219687 A1 * | 10/2005 | Aono et al. | 359/385 |
| 2010/0202030 A1 * | 8/2010 | Cho et al. | 359/205.1 |

FOREIGN PATENT DOCUMENTS

| | | |
|---|---|---|
| JP | 1984-198422 A | 11/1984 |
| JP | 61-9614 A | 1/1986 |
| JP | 63-296742 A | 12/1988 |
| JP | 2001-51208 A | 2/2001 |
| JP | 2004-309458 A | 11/2004 |
| JP | 2006-35535 A | 2/2006 |
| JP | 2006-162790 A | 6/2006 |
| JP | 2006-162994 A | 6/2006 |
| JP | 2007-33098 A | 2/2007 |
| KR | 10-2009-0025287 A | 3/2009 |
| WO | 2008/003967 A | 1/2008 |

OTHER PUBLICATIONS

Chinese Official Action (CN Applc. No. 201180020052.X), Mailed Sep. 18, 2014.

* cited by examiner

Optical path length difference

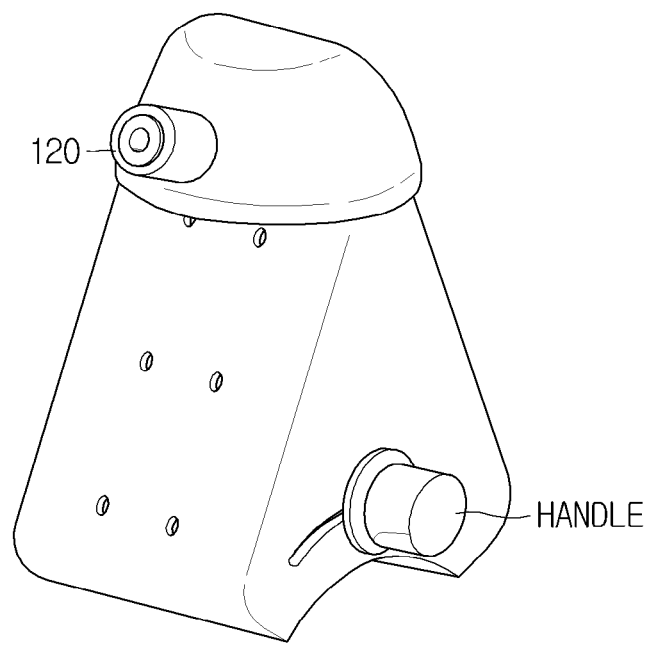

OPTICAL SYSTEM FOR FORMING OPTICAL PATH OF OBLIQUE ANGLE AND METHOD THEREOF

REFERENCE TO RELATED APPLICATIONS

This is a continuation of pending International Patent Application PCT/KR2011/001076 filed on Feb. 18, 2011, which designates the United States and claims priority of Korean Patent Application No. 10-2010-0015030 filed on Feb. 19, 2010, and Korean Patent Application No. 10-2011-0006799 filed on Jan. 24, 2011, the entire contents of which are incorporated herein by reference.

FIELD OF THE INVENTION

The present invention relates, in general, to optical systems and methods for operating the optical systems and, more particularly, to an optical system which is used in a microscope which is provided to observe a sample or in a light emitting device which applies a beam of light, such as a laser beam, onto a sample, and in which an oblique path of light can be formed by the optical system, so that even without shifting the sample or the position of the eyes of the observer who is using the microscope (or the position of a light source of the light emitting device), the observer can observe (in the case of the light emitting device, it can apply light onto) not only a vertical top side the sample but also a front, rear, left or right side of the sample at a predetermined oblique angle, and the position of a portion of the sample to be observed (in the case of the light emitting device, a portion onto which light is applied) can be varied, and a method for operating the optical system.

BACKGROUND OF THE INVENTION

Generally, in optical microscopes, the relative positioning between an objective (lens) and an eyepiece (or an eye lens) is fixed so that only when a sample is placed around an optical axis on a focal plane of the objective can it be observed. Thus, if it is required to observe a portion of a sample at an arbitrary angle or to vary the portion of the sample to be observed, there is no choice but to shift or tilt the sample, inconveniencing a user. Moreover, if the surface of the sample is very uneven or it is very large and heavy, for example, a human or animal body or a main body of a large machine, there are many restrictions, or it may be impossible to shift or tilt the sample.

In light emitting devices which apply a laser beam or the like onto a sample or object to machine it, light emitted from a light source is applied onto the sample of object by an optical system. If it is required to apply light onto the sample at an oblique angle or vary a portion to be applied of the sample, the sample or the optical system with the light source must be shifted. Thus, there are many restrictions like that of the microscope.

To overcome such restrictions, a technique in which an optical system is provided on a multi-joint shaft to enhance the degree of freedom was proposed. However, this technique is also configured such that an observer must be moved along with the device or the optical system. Therefore, this is not a fundamental solution to the problem. There are cases where microscopes attached to glasses are used in microsurgeries or fine work. In these cases, the above-stated restrictions can be mitigated, but magnification is limited, and movement of a user is also required.

SUMMARY OF THE INVENTION

Accordingly, the present invention has been made keeping in mind the above problems occurring in the prior art, and an object of the present invention is to provide an optical system which is configured such that in an optical or stereoscopic microscope rather than a digital microscope, an oblique path of light can be formed by the optical system so that even without shifting a sample or the position of the eyes of the observer who is using the microscope, the observer can observe not only the vertical plan view of a sample but also a front, rear, left or right side of the sample at an arbitrarily oblique angle or can also observe the sample in a manner of rotation around the vertical axis, and the position of a portion of the sample to be observed can be varied, and a method for operating the optical system.

Another object of the present invention is to provide an optical system in which an objective can be tilted within a predetermined range of polar angle and rotated to an arbitrary azimuth angle, and light that passes through the objective is controlled by an optical module such that the optical path length can be maintained constant and the light can be transmitted to a fixed eyepiece, and a method for operating the optical system.

A further object of the present invention is to provide an optical system in which the above-mentioned principle can be applied to a light emitting device as well as an optical microscope or a stereoscopic microscope, so that without moving the sample or a light source of the light emitting device, light can be applied onto the sample not only in the vertical direction but also in an oblique direction within a predetermined angular range based on the vertical axis, thus making it possible to apply light onto the sample in a manner of rotation around the vertical axis, and a method for operating the optical system.

In order to accomplish the above objects, in an aspect, the present invention provides an optical system, including a first optical unit and a second optical unit arranged to form a path of light, the optical system being configured such that an object is observed by using light coming from the object through the first optical unit and the second optical unit, or light transmitted to the second optical unit is applied onto the object through the first optical unit, wherein without movement of an observer or a light source of a device that applies light onto the object, the object can be observed at different angles or positions, or light is applied onto the object at different angles or positions.

The optical system is configured such that even when the first optical unit moves, light is transmitted to the same position, or the focal distance of the first optical unit with respect to the object is maintained constant, whereby the object can be observed at various angles or positions, or light can be applied onto the object at various angles or positions.

The first optical unit may include a first sub-system forming a path of light such that regardless of variation in an angle of an incident ray of light, the ray of light is transmitted therefrom to a same position. The second optical unit may include a second sub-system forming a path of light such that a length of the path of the incident ray of light is adjusted before the ray of light comes out of the second sub-system. A length of an entire path of light from the object to the second sub-system via the first sub-system is maintained constant.

A first lens may be coupled to the first sub-system so that the object is observed or the light is applied onto the object in such a way that an angle of the first lens to the object at which the object is observed or light is applied onto the object is varied.

The first lens may move to a left or right and vary a position thereof such that a polar or azimuth angle thereof varies. The optical system may be used in a microscope to observe the object in such a way that light reflected from the object sequentially passes through the first lens, the first sub-system, the second sub-system and a second lens.

The first lens may move to a left or right and vary a position thereof such that a polar or azimuth angle thereof varies. The optical system may be used in the device for applying light onto the object in such a way that light transmitted to a second lens coupled to the second sub-system sequentially passes through the second sub-system, the first sub-system and the first lens.

The first sub-system may include: a first light deflection module adjusting the path of light such that regardless of the angle of the incident ray of light, a ray of light angled to a predetermined fixed axis is changed into a ray of light parallel to the fixed axis; and a second light deflection module adjusting the path of light such that the ray of light parallel to the fixed axis is transmitted to the same position.

Each of the first light deflection and the second light deflection module may include two wedge prisms installed in a mechanical device to form the path of light such that polar or azimuth angles thereof varies depending on a variation in the angle of the incident ray of light that results from a variation in a position of a first lens coupled to the first sub-system.

Each of the first light deflection and the second light deflection module may include two right angle prisms installed in a mechanical device to form the path of light such that polar or azimuth angles thereof vary depending on a variation in the angle of the incident ray of light that results from a variation in a position of a first lens coupled to the first sub-system.

The first sub-system may include a light deflection module adjusting the path of light such that regardless of a variation in the angle of the incident ray of light, the ray of light angled to the predetermined fixed axis is transmitted to the same position.

The light deflection module may include two right angle prisms installed in a mechanical device to form the path of light such that polar or azimuth angles thereof vary depending on a variation in the angle of the incident ray of light that results from a variation in a position of a first lens coupled to the first sub-system.

The second sub-system may include a first prism, a second prism and a third prism that sequentially change the path of the incident ray of light, wherein the second sub-system is operated such that a distance between the second prism and the first prism or the third prism varies depending on a variation in the angle of the incident ray of light.

The first optical unit may include a first sub-system forming a path of light such that regardless of a variation in a position of an incident ray of light, the ray of light is transmitted therefrom to a same position. The second optical unit may include a second sub-system forming a path of light such that a length of the path of the incident ray of light is adjusted before the ray of light comes out of the second sub-system. A length of an entire path of light from the object to the second sub-system via the first sub-system is maintained constant.

A first lens may be coupled to the first sub-system so that the object is observed or the light is applied onto the object in such a way that an angle of the first lens to the object at which the object is observed or light is applied onto the object is varied.

The first lens may move to a left or right and varies a position thereof such that a polar or azimuth angle thereof varies. The optical system may be used in a microscope to observe the object in such a way that light reflected from the object sequentially passes through the first lens, the first sub-system, the second sub-system and a second lens.

The first lens may move to a left or right and varies a position thereof such that a polar or azimuth angle thereof varies. The optical system may be used in the device for applying light onto the object in such a way that light transmitted to a second lens coupled to the second sub-system sequentially passes through the second sub-system, the first sub-system and the first lens.

The first sub-system may include a light deflection module adjusting the path of light such that regardless of a variation in a length of the incident ray of light that results from a variation in the position of the incident ray of light, the incident ray of light parallel to a predetermined fixed axis is transmitted to the same position.

The light deflection module may include two wedge prisms installed in a mechanical device to form the path of light such that polar or azimuth angles thereof vary depending on a variation in the length of the incident ray of light that results from a variation in a position of a first lens coupled to the first sub-system.

The light deflection module may include two right angle prisms installed in a mechanical device to form the path of light such that polar or azimuth angles thereof vary depending on a variation in the length of the incident ray of light that results from a variation in a position of a first lens coupled to the first sub-system.

The second sub-system may include a first prism, a second prism and a third prism that sequentially change the path of the incident ray of light, wherein the second sub-system is operated such that a distance between the second prism and the first prism or the third prism varies depending on a variation in the position of the incident ray of light.

The first optical unit may include a first lens disposed at a position spaced apart from the object by a predetermined distance. The second optical unit may include a second lens provided at a position spaced apart from the first lens by a predetermined distance. The first lens is configured such that when the first lens moves, the first lens is spaced apart from the object by a focal distance of the first lens, and collimated light rays (including quasi-collimated light rays) are formed in a space between the first lens and the second lens.

An image of the object may be formed at a focus of the second lens, or light may be applied onto the object at a focal distance of the second lens.

An angle of the first lens to the object at which the object is observed or light is applied onto the object may be varied so that the object is observed at various angles or the light is applied onto the object at various angles.

The first lens may move to a left or right and varies a position thereof such that a polar or azimuth angle thereof varies. The optical system may further include at least one light path changing unit installed in a mechanical device such that a position thereof is varied depending on variation in the angle of the first lens to the object that results from variation in the position of the first lens, the light path changing unit changing a path of the collimated light rays between the first lens and the second lens. The light path changing unit may include a mirror or prism.

In another aspect, the present invention provides a method of operating an optical system, including: arranging a first optical unit and a second optical unit to form a path of light; and observing an object using light coming from the object through the first optical unit and the second optical unit, or applying light transmitted to the second optical unit onto the object through the first optical unit, wherein without movement of an observer or a light source of a device for applying light onto the object, the object can be observed at different angles or positions, or light is applied onto the object at different angles or positions.

In an optical system according to the present invention, a user can conveniently observe not only a vertical top surface of a sample (an object) but also side surfaces thereof, successively, despite being used in the same manner as that of the existing microscope. Therefore, because the user can observe the sample in three dimensions, the optical system of the present invention is more convenient for the user compared to that of the existing microscope. Particularly, in work which requires observation and manipulation at the same time, the effects of the present invention can be maximized.

Furthermore, the present invention makes it possible to observe the sample or object at an oblique angle so that the user can observe the sample in three dimensions. Because it is not necessary for the user to move while observing the object in three dimensions, the user can conveniently and stably process the object (e.g. manufacture or repair an electronic part, machine or inspect a fine object, or perform microsurgery), and the amount of fatigue of the user can be reduced.

The principle of the present invention can also be applied to a light emitting device as well as an optical microscope or a stereoscopic microscope. Light can be applied onto the sample not only in the vertical direction but also from an oblique direction within a predetermined angular range based on the vertical axis without moving the sample or a light source of the light emitting device. Thereby, light can also be applied onto the sample in the manner of rotating around the vertical axis.

BRIEF DESCRIPTION OF THE DRAWINGS

FIG. 24 is a perspective view showing an example of a microscope to which the optical system of FIG. 18 or 23 is applied.

DETAILED DESCRIPTION OF THE INVENTION

Figure 1:
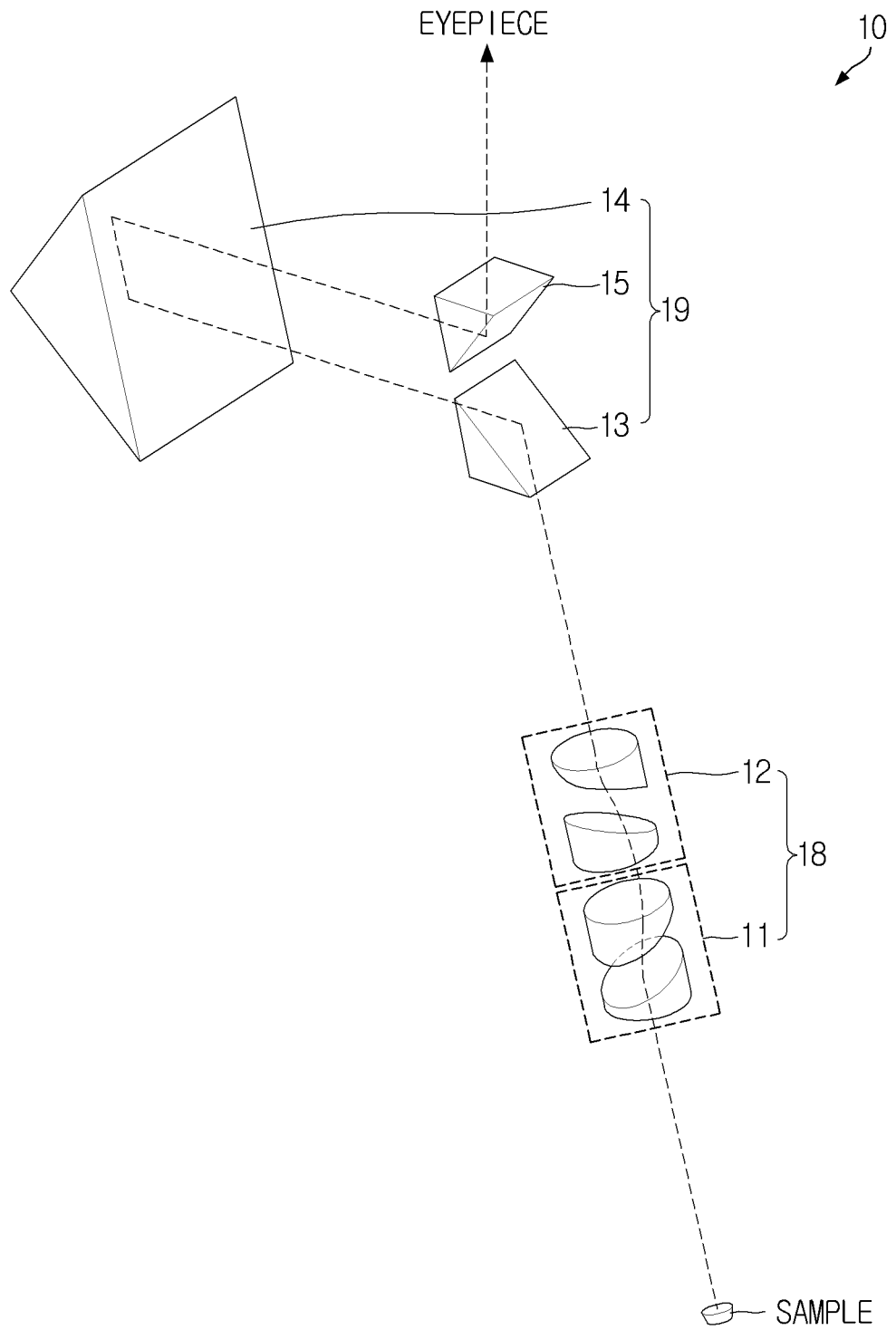
FIG. 1 is a view illustrating an optical system, according to an embodiment of the present invention.

Hereinafter, preferred embodiments of the present invention will be described in detail with reference to the attached drawings, but the present invention is not limited to the preferred embodiments. The same reference numerals will be used throughout the different drawings to designate the same or similar components.

FIG. 1 is a view illustrating an optical system 10, according to an embodiment of the present invention.

Referring to FIG. 1, the optical system 10 according to the embodiment of the present invention includes a first sub-system 18 which has a first light deflection module 11 and a second light deflection module 12, and a second sub-system 19 which has a first prism 13, a second prism 14 and a third prism 15.

The first sub-system 18 forms a path for the light so that the light is transmitted to the same position regardless of variations in the angle of incident light. In an embodiment, the first sub-system 18 is provided with an objective (refer to FIG. 15) to which light is transmitted from a sample (an object). The objective can move to the left and right and vary its position. Here, the objective can move to the left and right such that the polar angle or azimuth angle thereof is varied.

The second sub-system 19 forms a path for the incident light so that the length of the path of light can be controlled before the light exits therefrom. The second sub-system 19 includes a first prism 13, a second prism 14 and a third prism 15 which sequentially vary the path traveled by the incident light. The second sub-system 19 is operated such that depending on an angle at which light enters the first sub-system 18, the distance between the second prism 14 and the first prism 13 or the third prism 15 varies so that the length of the entire path of light from the sample to the second sub-system 19 via the first sub-system 18 can be maintained constant. Each of the first prism 13, the second prism 14 and the third prism 15 is a right angle prism. The right angle prism has a right triangular cross-section, wherein light that hypotenuse is reflected back by one right-angled side before exiting through the other right-angled side. Although each of the first prism 13, the second prism 14 and the third prism 15 has been illustrated as being a right angle prism, the present invention is not limited to this embodiment. If necessary, reflection mirrors may be used, in lieu of the prisms 13, 14 and 15, to embody the second sub-system 19. For example, reflection mirrors may be respectively disposed at positions corresponding to the total reflection surfaces of the prisms 13, 14 and 15, in other words, total four reflection mirrors can conduct the same role as that of the prisms 13, 14 and 15.

As such, the optical system 10 according to the embodiment of the present invention forms a path for the light such that the length of the entire path of light from the sample to the second sub-system 19 via the first sub-system 18 remains constant. Therefore, an oblique path of light can be formed by the optical system so that even without shifting the sample or the position of the eyes of an observer who is using a microscope, not only can the observer observe the vertical plan view of the sample but he/she can also observe a front, rear, left or right side of the sample at an arbitrarily oblique angle by changing the angle of observation or can also observe the sample by rotating around the vertical axis.

For example, the objective into which light is transmitted from the sample is coupled to the first sub-system 18. Regardless of any variation in the angle at which light enters the first sub-system 18 which depends on the variation in the position of the objective, the optical system of the present invention can form a path for the light such that the length of the entire path of light from the sample to the second sub-system 19 via the first sub-system 18 is maintained constant.

As such, because the length of the overall path of light can be maintained constant regardless of any variation in the angle at which light enters the first sub-system 18 which depends on the variation in the position of the objective, the observer who sees the light that has sequentially passed through the objective, the first sub-system 18, the second sub-system 19 and the eyepiece can observe the sample in place at an oblique angle without carrying out a cumbersome operation of having to shift the objective to re-adjust the magnification.

Furthermore, the optical system 10 according to the embodiment of the present invention can be used as an optical system not only for an optical microscope or a stereoscopic microscope but also for a light emitting device which is used to machine a sample. In the case of the light emitting device, for example, the optical system is configured such that light such as a laser beam enters a lens (a concave lens, a convex lens, a collimator or the like) that substitutes for an eyepiece coupled to the second sub-system 19, and sequentially passes through the second sub-system 19, the first sub-system 18 and a lens (a concave lens, a convex lens, a collimator or the like) that substitutes for the objective coupled to the first sub-system 18, before the laser beam is applied onto the sample. In this case, the angle at which light is applied onto the sample can be varied without shifting a light source or another optical system other than the optical system 10 used in the light emitting device, so that light can be applied at an oblique angle onto the sample.

Hereinafter, the operation of different kinds of embodiments of the optical system of the present invention will be described, focusing the attention on examples in which the embodiments are applied to microscopes. The present invention is however not limited to these embodiments. For instance, the optical system of the present invention may be used as an optical system of a light emitting device or the like which is used to machine a sample by switching the directions in which light enters and exits the system. Further, for the sake of explanation, although the operation of optical system will be explained based on light (a ray of light) that passes through the centers of the prisms of the optical system of the present invention, light (rays of light) that pass through portions which are slightly off-center relative to the center of each prism must be regarded as entering the prism, passing through it, and exiting therefrom according to the same principle.

Figure 2:
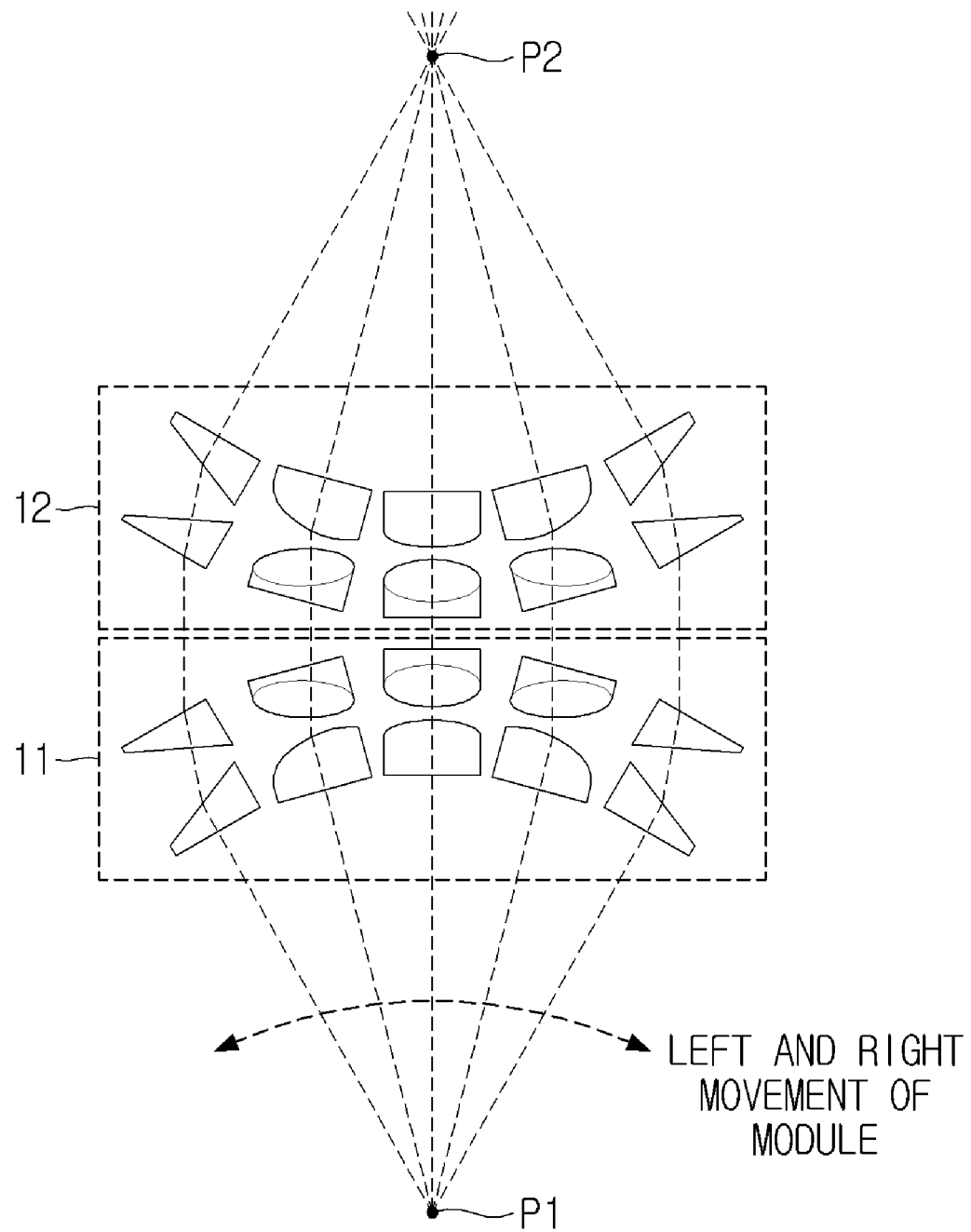
FIG. 2 shows an example of a light deflection module which transmits light to the same position according to the embodiment of the present invention.

FIG. 2 shows an example of a light deflection module which transmits light to the same position according to the embodiment of the present invention.

For instance, the objective is coupled to the first sub-system 18 (refer to FIG. 15) so that when the objective moves to the left or the right (in a lateral direction), the polar angle or azimuth angle thereof can vary. The first light deflection module 11 adjusts the path of light so that regardless of the angle that an incident ray of light makes with the first light deflection module 11, the ray of light transmitted from the objective becomes parallel to a fixed axis (e.g. when the prisms of the first light deflection module 11 are positioned at the center of the lateral movement range, the fixed axis connects the sample to the centers of the prisms of the first light deflection module 11, and in this example, the fixed axis refers to an axis that connects point P1 to point P2). The second light deflection module 12 adjusts the path of the light such that the ray of light that is parallel to the fixed axis is transmitted to the same single point P2. As such, in order to form the path of light such that regardless of any variation in the angle that the incident ray of light makes with the first light deflection module 11, the ray of light is transmitted from the second light deflection module 12 to the same position, each of the first and second light deflection modules 11 and 12 includes two wedge prisms. The shape of each wedge prism is that of a wedge that is formed by cutting a medial portion of a cylinder. The wedge prism is configured such that depending on the orientation of the wedge prism, the direction of a ray of light that enters a bottom surface of the wedge prism is changed when it exits from the opposing surface thereof. The double-wedge prism structure refers to a Risley prism. The double-wedge prism structure can be installed on a device (see FIG. 15) such that depending on the variation in the angle that the incident ray of light makes with the double-wedge prism structure, as shown in FIG. 2, the polar or azimuth angle thereof varies. Referring to polar coordinates rather than XYZ rectangular coordinates, the polar angle $\Theta$ is an angle made when moving from the Z axis in the direction of the −Z axis without varying the distance r from the origin or azimuth angle $\phi$, and the azimuth angle $\phi$ is an angle made when moving from the X axis in the direction of the −X axis without varying the distance r from the origin or the polar angle $\Theta$.

Figure 3:
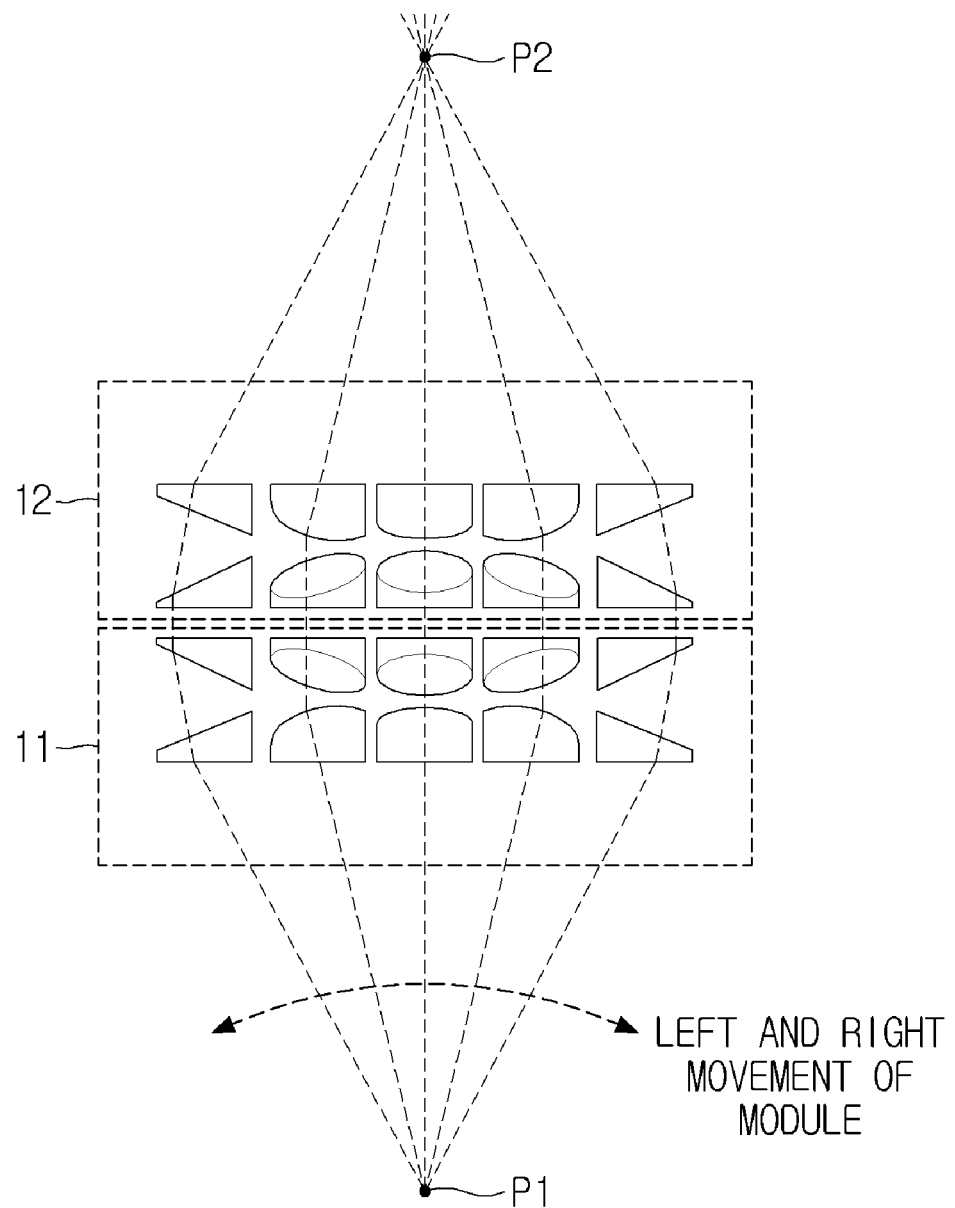
FIG. 3 shows another example of the light deflection module which transmits light to the same position according to the embodiment of the present invention.

FIG. 3 shows another example of the light deflection module which transmits light to the same position according to the embodiment of the present invention.

Figure 15:
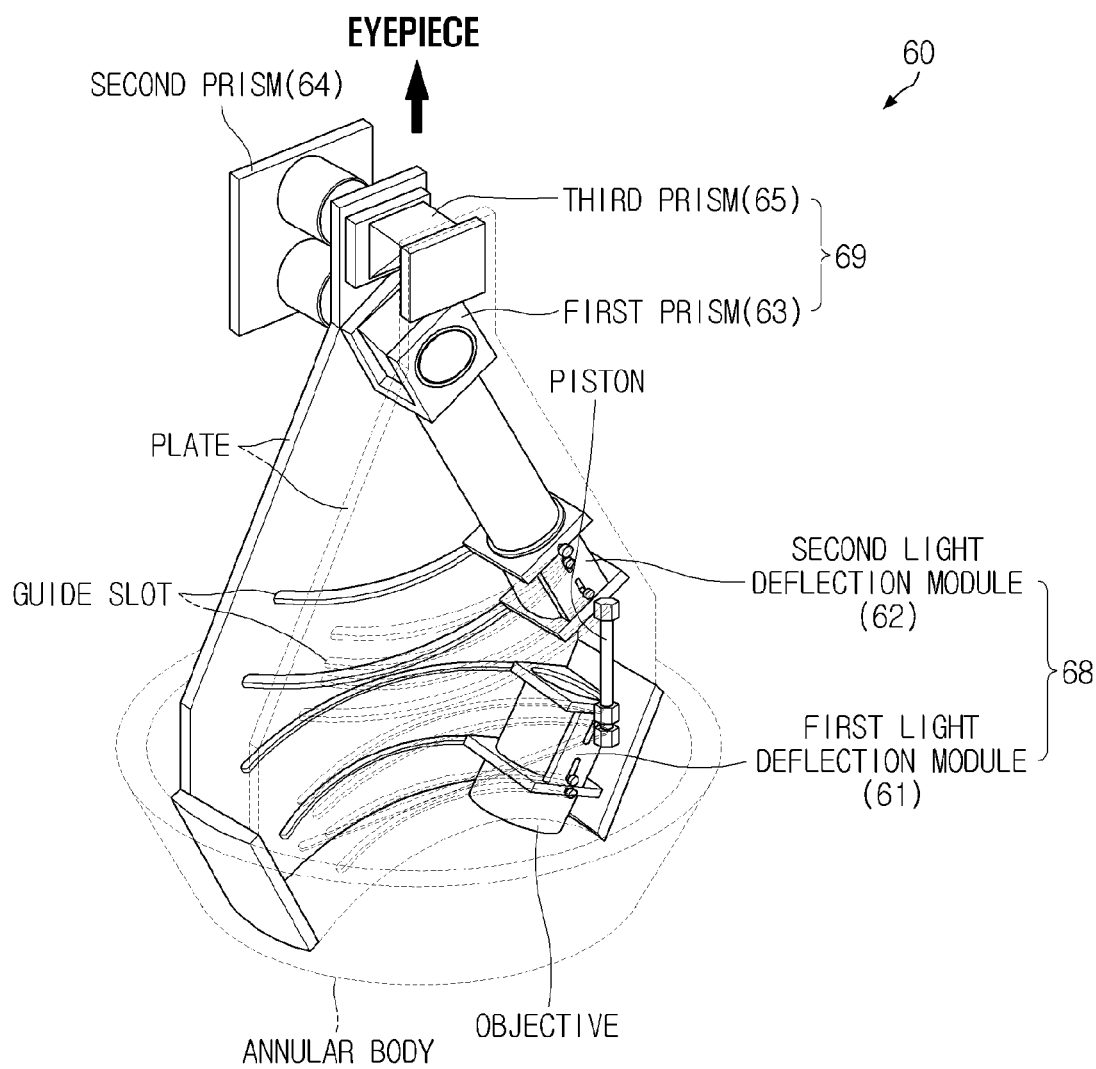
FIG. 15 illustrates an example of a mechanical device embodied by the optical system of the present invention.

As shown in FIG. 3, two wedge prisms of each of the first and second light deflection modules 11 and 12 may be installed on the device such that depending on variation in the angle of a ray of light transmitted from the objective, only the azimuth angle thereof varies without moving in the polar angle direction (refer to FIG. 15).

FIGS. 2 and 3 illustrate examples in which two wedge prisms are arranged at upper and lower positions in each of the first and second light deflection modules 11 and 12 so that regardless of the angle of a ray of light that starts from the single point P1, the ray of light is transmitted to the same single point P2. In detail, FIGS. 2 and 3 show the cases where the rays of light that come out from the single point P1 at angles of −28°, −14°, 0°, 14° and 28° can be gathered on the same single point P2 via the first light deflection module 11 and the second light deflection module 12. Depending on the arrangement of the first and second light deflection modules 11 and 12 and the paths along which they move, the design of FIG. 2 or 3 can be embodied.

The ray of light that has been transmitted to one point, that is, to the point P2, as shown in FIG. 1, is reflected by the first prism 13 that rotates at the same angle as that of the second light deflection module 12, and is then transmitted to the second prism 14. The ray of light that has been reflected by the second prism 14 is transmitted to the eyepiece by the third prism 15. As such, because the first prism 13 rotates always at the same angle as that of the second light deflection module 12, a ray of light that comes out of the second light deflection module 12 and enters the first prism 13 is always perpendicular to the incident surface of the first prism 13.

Therefore, if the present invention is used in an image formation optical system in such a way that the objective is disposed ahead of the first light deflection module 11, the observer can observe a sample at various angles despite the location at which the eyes of the observer see it being fixed. In the same manner, if the present invention is used in an optical system for the transmission of energy or illumination, light (e.g. a laser beam) that is emitted from a fixed light source or a fixed energy source (a laser source or the like) can be applied onto a sample at various angles.

Figure 4:
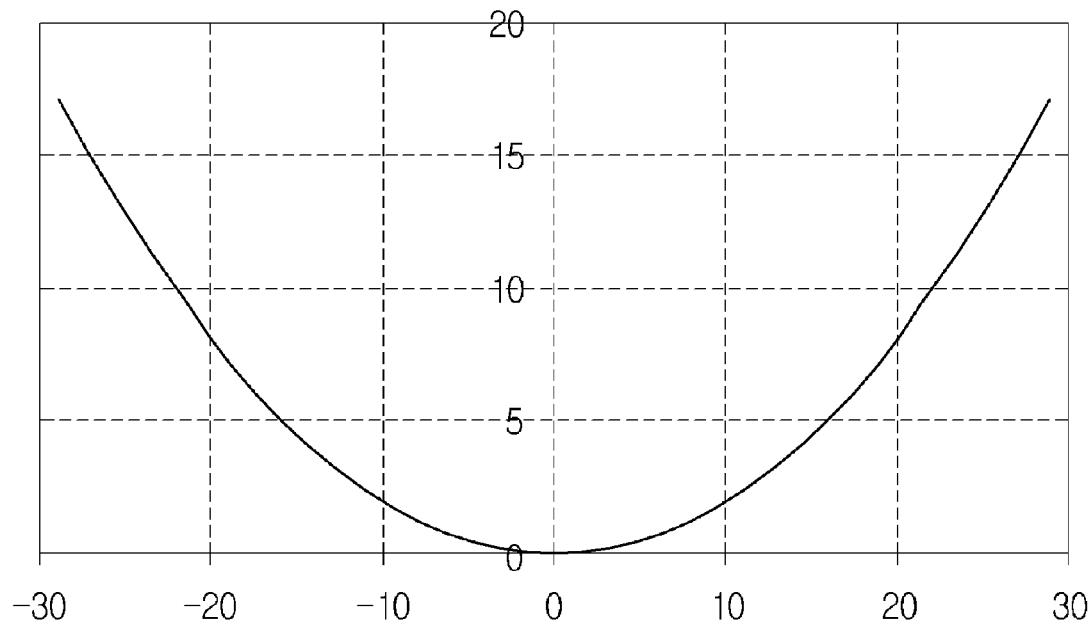
FIG. 4 is a graph showing a difference in the length of the path of light as a function of an angle at which light enters the optical system according to the embodiment of the present invention.

FIG. 4 is a graph showing a difference in the length of the path of light as a function of an angle at which the light enters the optical system according to the embodiment of the present invention.

Referring to FIG. 4, it can be understood that depending on variation in the position of the objective, in other words, depending on a variation in the angle of the incident ray of light transmitted from the point P1 at which the sample is placed, the length of the entire path of light that is transmitted from the sample to the second sub-system 19 via the first sub-system 18, that is, the entire distance that light which comes out of the sample passes through the first light deflection module 11, the second light deflection module 12, the first prism 13, the second prism 14 and the third prism 15, is varied. In detail, the path of a ray of light that vertically enters the first light deflection module 11 is a reference. That is, in this case, the angle of the path of light on the reference is 0, and the difference in the length of the path of light is also 0. As the angle of the path of light based on this reference is increased, the length of the path of light is also increased symmetrically with respect to the left and the right. Therefore, an optical path length which is a length of the path of light between the sample and the observer or the light source is varied depending on the angle. To compensate for this, the optical system of the present invention is configured such that the prisms can be appropriately shifted. If such an optical path length difference is not compensated for, a constant optical quality cannot be achieved. For instance, in the image formation optical system, the magnification may vary depending on the angle. When the energy of a laser source is transmitted and focused by the lens, the position of the focal point can be varied.

Figure 5:
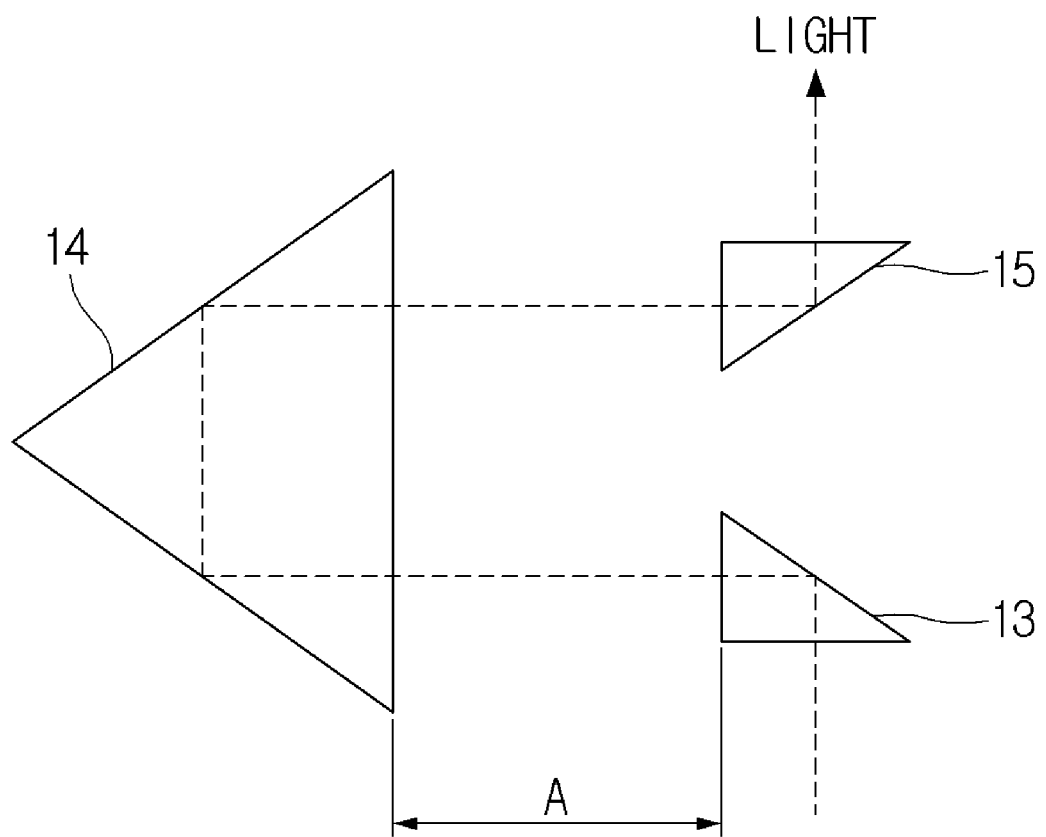
FIG. 5 is a view illustrating the operation of a second sub-system that compensates for the length of the optical path of the optical system when it is comparatively short according to the embodiment of the present invention.
Figure 6:
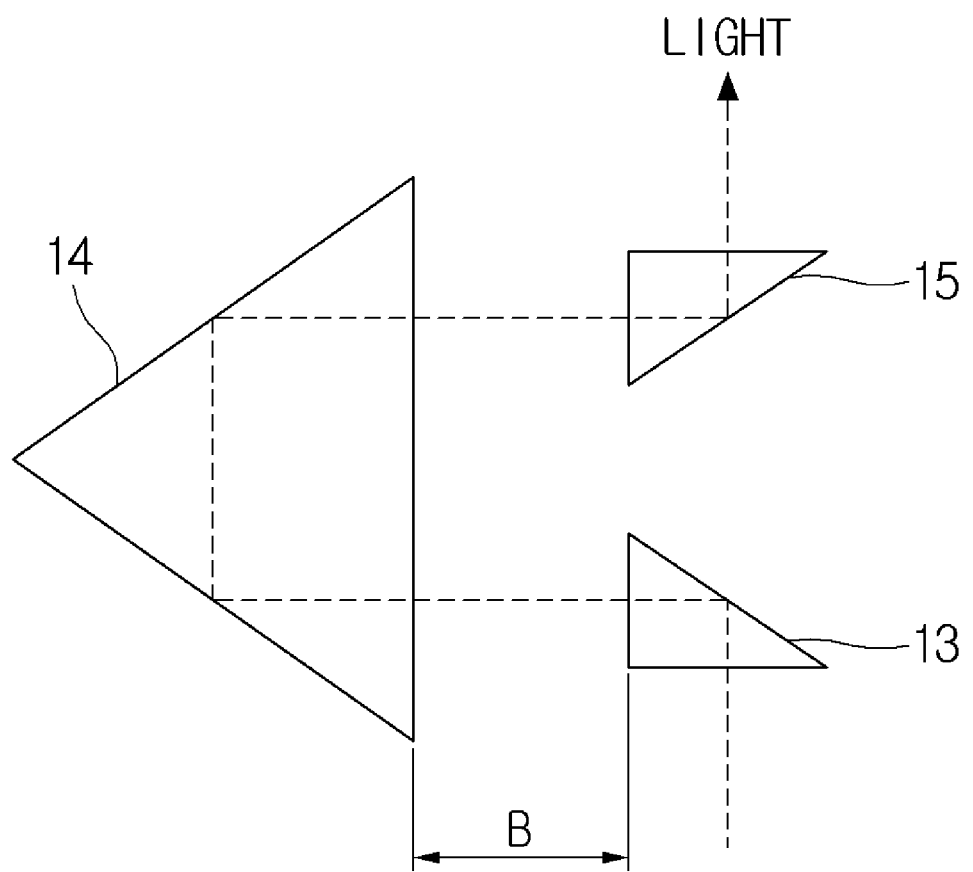
FIG. 6 is a view illustrating the operation of the second sub-system that compensates for the length of the optical path of the optical system when it is comparatively long according to the embodiment of the present invention.

As shown in FIG. 4, when light vertically enters the first light deflection module 11, the length of the path of light is the shortest. When light enters the first light deflection module 11 at a predetermined angle rather than in a vertical direction, the length of the path of light is increased. To compensate for this, as shown in FIG. 5, mechanical elements are designed (refer to FIG. 15) such that when the angle that an incidence ray of light makes with the first light deflection module 11 is perpendicular (that is, when the length of the path of light is comparatively short), the distance between the second prism 14 and the first or third prism 13 or 15 is increased (for example, A). As shown in FIG. 6, the mechanical elements are designed (refer to FIG. 15) such that when light enters the first light deflection module 11 at a predetermined angle, rather than perpendicularly, (that is, when the length of the path of light is comparatively long), the distance between the second prism 14 and the first or third prism 13 or 15 is reduced (for example, B).

The distance between the second prism 14 and the first or third prism 13 or 15 can be adjusted by controlling related mechanical elements such that only the second prism 14 is moved without moving the first prism 13 and the third prism 15 that are on the same axis. Thereby, the entire optical path length can be maintained constant. For instance, under conditions in which the first prism 13 and the third prism 15 are on the same axis and are fixed, the entire optical path length can be maintained constant by controlling the mechanical elements such that 2(A−B) coincides with the difference in the length of the path of light of FIG. 4.

Figure 7:
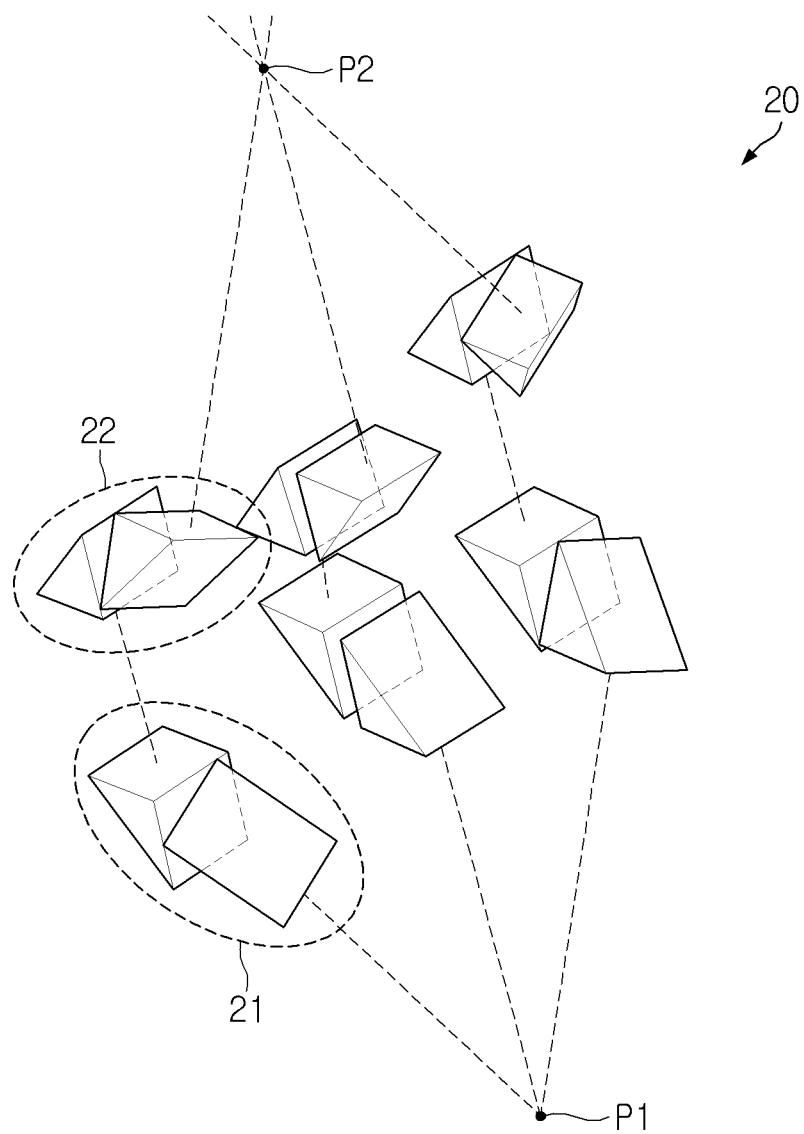
FIG. 7 is a view showing an optical system, according to another embodiment of the present invention.
Figure 8:
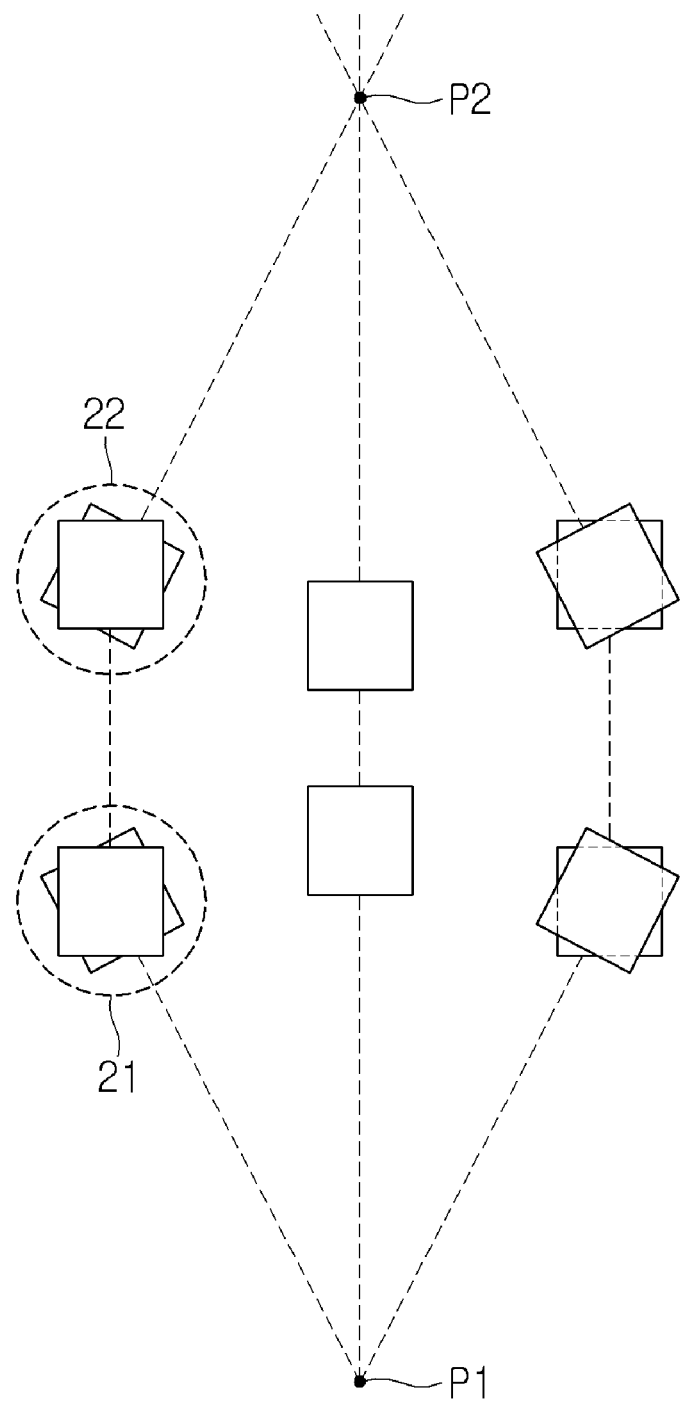
FIG. 8 is a plan view illustrating the optical system of FIG. 7.

FIG. 7 is a view showing an optical system 20 in which a light deflection module is provided with right angle prisms, according to another embodiment of the present invention. FIG. 8 is a plan view of the optical system 20 of FIG. 7.

Referring to FIGS. 7 and 8, the optical system 20 according to this embodiment of the present invention includes a sub-system (a first sub-system) which is provided with a first light deflection module 21 and a second light deflection module 22. Unlike the embodiment of FIG. 1, in lieu of the wedge prisms that are respectively disposed at the upper and lower positions, each of the first and second light deflection modules 21 and 22 includes two right-angled prisms which are respectively disposed at front and rear positions or at left and right positions on a predetermined mechanical element. The residual construction of the optical system 20 is similar to that of the embodiment of FIG. 1 that includes the prisms 13, 14 and 15. The operating principle of the optical system 20 is the same as illustrated in FIG. 1.

In the operation of the first light deflection module 21 and the second light deflection module 22, for instance, when the objective moves to the left or right, the positions of the right angle prisms that are provided on the mechanical element are varied such that the polar angle or azimuth angle is varied depending on the variation in the angle of light transmitted from the position P1 at which the sample is placed. The first light deflection module 21 adjusts the path of the light so that regardless of the angle that an incident ray of light makes with the first light deflection module 21, the ray of light of light transmitted from the sample becomes parallel to a fixed axis (e.g. when the prism of the first light deflection module 21 that is adjacent to the sample is positioned at the center of the lateral movement range, the fixed axis connects the sample to the center of the prism of the first light deflection module 21 that is adjacent to the sample). The second light deflection module 22 adjusts the path of the light such that the ray of light that is parallel to the fixed axis is transmitted to the same point P2.

FIGS. 7 and 8 illustrates paths of light which are defined by the first light deflection module 21 and the second light deflection module 22 that use the right angle prisms such that regardless of the angle of a ray of light that starts from the single point P1, the ray of light is transmitted to the same single point P2. In detail, FIGS. 2 and 3 show the cases where the ray of lights of light that come out from the point P1 at angles of −28°, 0° and 28° are made parallel to the fixed axis by the first light deflection module 21, and then the ray of lights of light that are parallel to the fixed axis are transmitted to the same point P2 by the second light deflection module 22. When the optical system 20 of this embodiment having the above-mentioned construction is used in an observation device such as a microscope, it also enables the observer to observe a sample at different angles.

Figure 9:
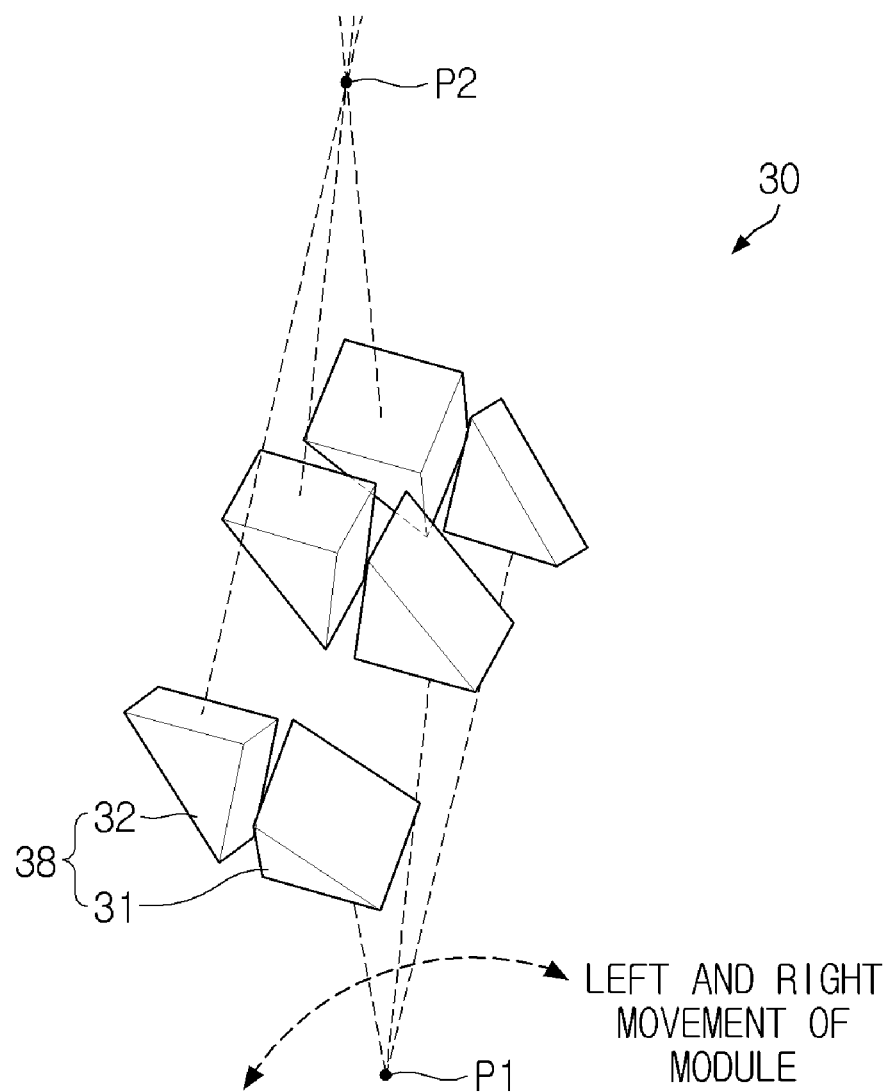
FIG. 9 is a view showing an optical system, according to a further embodiment of the present invention.
Figure 10:
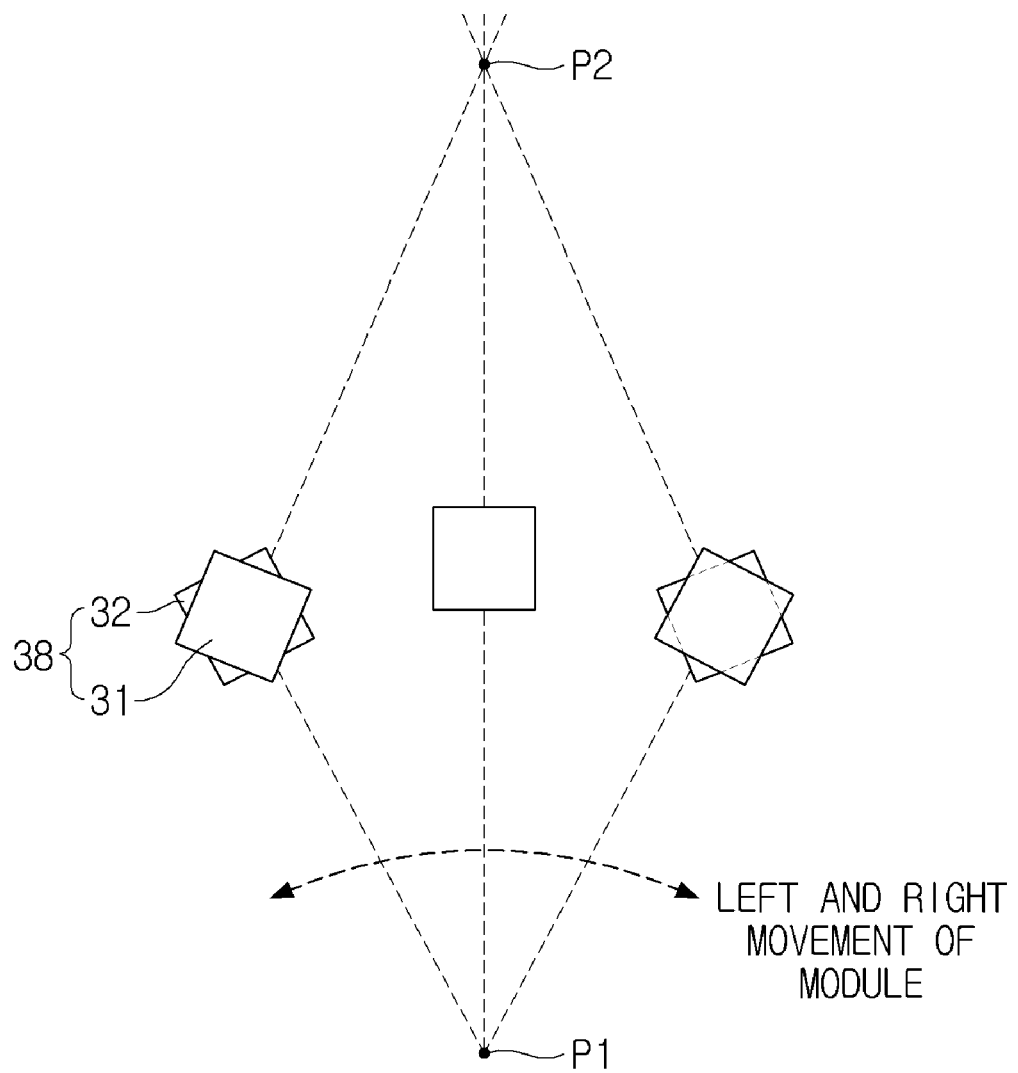
FIG. 10 is a plan view illustrating the optical system of FIG. 9.

FIG. 9 is a view showing an optical system 30, according to a further embodiment of the present invention. FIG. 10 is a plan view illustrating the optical system 30 of FIG. 9.

Referring to FIGS. 9 and 10, the optical system 30 according to this embodiment of the present invention includes a sub-system (a first sub-system) which is provided with only single light deflection module 38. The light deflection module 38 includes right angle prisms 31 and 32 which are respectively disposed at front and rear positions or at left and right positions on a predetermined mechanical element. The residual construction of the optical system 30 is similar to that of the embodiment of FIG. 1 that includes the prisms 13, 14 and 15. The operating principle the optical system 30 is the same as illustrated in FIG. 1.

Although the sub-system of this embodiment includes the single light deflection module 38, it can be made to adjust the path of light such that regardless of the angle that an incident ray of light transmitted from the position P1 of a sample makes with the light deflection module 38, even when the incident ray of light is angled to a fixed axis (e.g. when a first prism 31 of the light deflection module 38 is positioned at the center of the lateral movement range, the fixed axis connects the sample to the center of the first prism 31 of the light deflection module 38), the ray of light is transmitted to the same point P2. For instance, when the objective moves to the left or right, the positions of the right angle prisms that are provided on the mechanical element are varied such that the polar angle or the azimuth angle is varied depending on variation in the angle of light transmitted from the position P1 at which the sample is placed. Here, the light deflection module 38 adjusts the path of light so that regardless of the angle of an incident ray of light transmitted from the sample, the ray of light is directly transmitted to the single same position P2. In this embodiment, a separate light deflection module that makes the incident ray of light parallel to the fixed axis is not required.

FIGS. 9 and 10 illustrates paths of light which are defined by the single light deflection module that use the right angle prisms 31 and 32 such that regardless of the angle of a ray of light that starts from the single point P1, the ray of light is transmitted to the same point P2. In detail, FIGS. 9 and 10 show the cases where the ray of lights of light that come out from the point P1 at angles of −28°, 0° and 28° are bent perpendicularly in horizontal directions by the right angle prism 31, and then are bent perpendicularly by the right angle prism 32 so that the ray of lights of light are transmitted to the single ultimate point P2. When the optical system 30 of this embodiment having the above-mentioned construction is used in an observation device such as a microscope, it also enables the observer to observe a sample at different angles.

In the case of FIGS. 9 and 10, a first plane which is defined by ray of lights of light that come out of the start point P1 is parallel to a second plane which is defined by three ray of lights of light that are focused on the arrival point P2, but the first and second planes do not intersect each other. In this case, as in an ideal case, because a collimated ray of light always enters a prism or comes out of a prism perpendicularly, there is no chromatic aberration. If it is required to deviate from the ideal case because of reasons stemming from the mechanical design, for example, if the arrival point P2 must be positioned on the first plane, the angle (the polar or azimuth angle) of the prism may be varied. In this case, if a reflection mirror is used, chromatic aberration can be eliminated. However, if the reflection mirror is used, optical loss is increased due to the reflectance of the mirror compared to the case where only the prisms are used. Therefore, this must be considered in the design.

Figure 11:
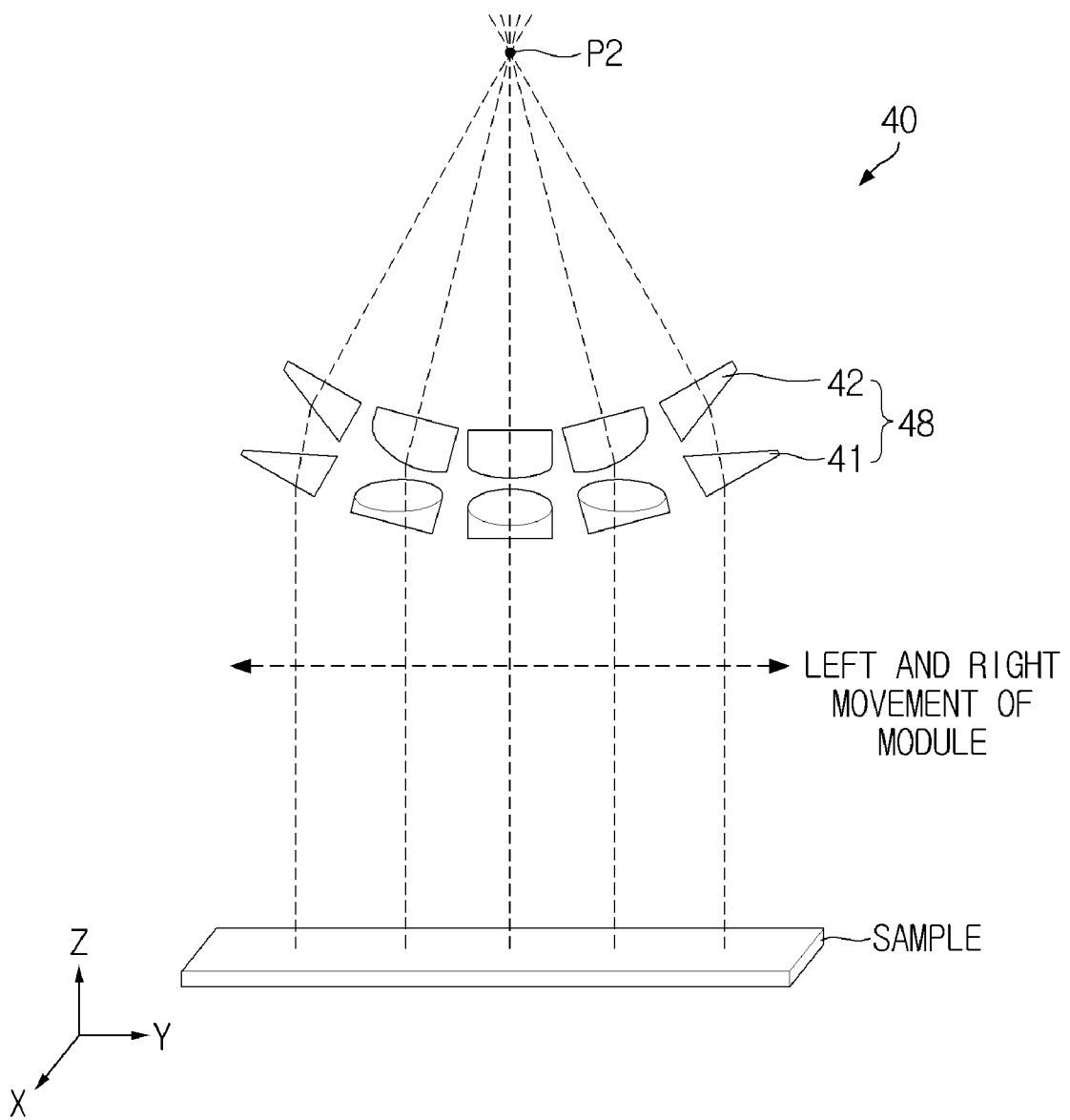
FIG. 11 is a view showing an optical system, according to yet another embodiment of the present invention.

FIG. 11 is a view showing an optical system 40, according to yet another embodiment of the present invention.

Referring to FIG. 11, the optical system 40 according to this embodiment of the present invention includes a sub-system (a first sub-system) which is provided with only a single light deflection module 48. The light deflection module 48 includes two wedge prisms 41 and 42 which are respectively disposed at upper and lower positions on a predetermined mechanical element. The residual construction of the optical system 40 is similar to that of the embodiment of FIG. 1 that includes the prisms 13, 14 and 15. The operation principle the optical system 40 is the same as illustrated in FIG. 1.

This embodiment makes it possible to vary the position of a portion to be observed rather than to vary the angle of observation (or the angle of a ray of light that comes out of the sample). That is, the observer can observe the sample within a predetermined range while varying the position of a portion to be observed without moving the position of the observer. Furthermore, if this embodiment is used in an optical system for transmitting energy, e.g. in a light emitting device, it can apply the energy of a light source onto the sample while varying the position of a portion that light is applied to even without shifting the sample or the light source. For example, in laser machining, if an object is heavy or fixed, or when it is difficult to move the object because it is susceptible to vibrations, this embodiment is very useful.

As shown in FIG. 11, the light deflection module 48 defines the path of light such that regardless of variation in the distance of an incident ray of light, the ray of light is transmitted to the same position. For instance, the objective to which light is transmitted from the sample can be coupled to the first sub-system 18 provided with the light deflection module 48 (refer to FIG. 15). The objective can move to the left and right and vary its position. Here, the objective can move to the left and right such that the polar angle or azimuth angle thereof is varied.

Thereafter, a second sub-system 19 provided with prisms 13, 14 and 15, as shown in FIG. 1, forms the path of light such that the length of the path of light transmitted from the light deflection module 48 is adjusted before the light comes out of the second sub-system 19. As described with reference to FIG. 1, the second sub-system 19 includes the first prism 13, the second prism 14 and the third prism 15 which sequentially vary the path of an incident ray of light. The second sub-system 19 is operated such that depending on variation in the distance of an incident ray of light that enters the light deflection module 48, the distance between the second prism 14 and the first prism 13 or the third prism 15 is adjusted so that the overall length of the path of light between the first sub-system 18 provided with the light deflection module 48 and the second sub-system 19 can remain constant.

Figure 12:
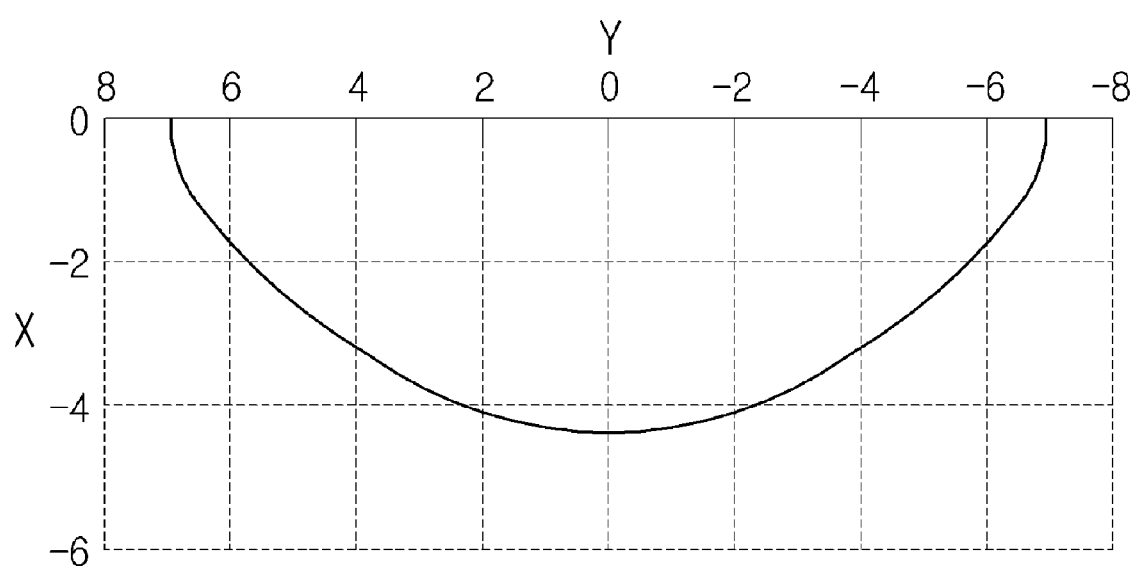
FIG. 12 illustrates an example of a path followed by a position of a light deflection module of FIG. 11.

FIG. 12 is a view illustrating an example of a path followed by a position of the light deflection module 48 of FIG. 11.

Referring to FIG. 11, if the axis that is perpendicular to the Y-Z plane refers to the X-axis, when the position of an observation area of the sample varies along the Y-axis, the prisms 41 and 42 provided on the mechanical element of the light deflection module 48 move or rotate to corresponding angles (polar or azimuth angles) so that an incident ray of light is transmitted to a fixed point P2, wherein the incident ray of light enters the light deflection module 48 from the sample in a direction parallel to a fixed axis (e.g. when the first prism 41 of the light deflection module 48 is positioned at the center of the lateral movement range, the fixed axis connects the sample to the center of the first prism 41 of the light deflection module 48) while the distance between the sample and the light deflection module 48 varies. Here, as shown in FIG. 12, the ray of light is not on the Y-Z plane, and the X-value thereof is not zero. In other words, the ray of light passes through the center of the second prism 42 but passes through a point away from the center of the first prism 41.

That is, as shown in FIG. 12, the center of the area that is actually observed when the light deflection module 48 moves on the Y-Z plane follows a curved path rather than a linear path. As such, if the two wedge prisms 41 and 42 are used in the light deflection module 48, not only deflection in which the angle of the ray of light varies but also displacement in which the ray of light moves away from the axis are induced. To cause the path of the center of the area that is observed in response to the left or right movement of the light deflection module 48 be linear, the displacement of the light deflection module 48 is adjusted with respect to the −X direction rather than moving in a linear direction. In other words, the light deflection module 48 is configured such that as it moves to the left or right from the center (Y=0) of the entire observation area of the sample, the displacement with respect to the −X direction is gradually reduced.

The optical system 40 according to this embodiment having the above-mentioned construction defines the path of light such that the overall length of the path of light from the sample to the second sub-system 19 via the first sub-system provided with the light deflection module 48 is maintained constant. Therefore, the path over which light using the optical system moves can be made only by moving the position of the light deflection module 48 so that even without shifting the sample or the position of the eyes of an observer who is using a microscope, the position of a portion of the sample to be observed can be varied to the left or right. In addition, the optical system 40 makes it possible for the observer to observe the sample in a manner of it rotating around the vertical axis.

For example, the objective into which light is transmitted from the sample is coupled to the first sub-system provided with the light deflection module 48. Regardless of any variation in the distance that a ray of light that is transmitted from the sample to the light deflection module 48 which depends on the variation in the position of the objective, the overall length of the path of light from the sample to the second sub-system 19 via the first sub-system 48 is maintained constant. As such, because the overall length of the path of light can be maintained constant regardless of any variation in the distance that a ray of light which is transmitted from the sample travels to reach the light deflection module 48 which depends on the variation in the position of the objective, the observer who sees light that sequentially passes through the objective, the first sub-system, the second sub-system 19 and an eyepiece can observe in place the sample while varying the position of a portion of the sample to be observed without having to carry out the cumbersome operation of shifting the objective to re-adjust the magnification.

Furthermore, the optical system 40 according to the embodiment of the present invention can be used as an optical system not only of an optical microscope or a stereoscopic microscope but also of a light emitting device which is used to machine a sample. In the case of the light emitting device, for example, the optical system is configured such that light such as a laser beam enters a lens (a concave lens, a convex lens, a collimator or the like) that substitutes for the eyepiece coupled to the second sub-system 19, and sequentially passes through the second sub-system 19, the light deflection module 48 and a lens (a concave lens, a convex lens, a collimator or the like) that substitutes for the objective coupled to the light deflection module 48, before the laser beam is applied onto the sample.

Figure 13:
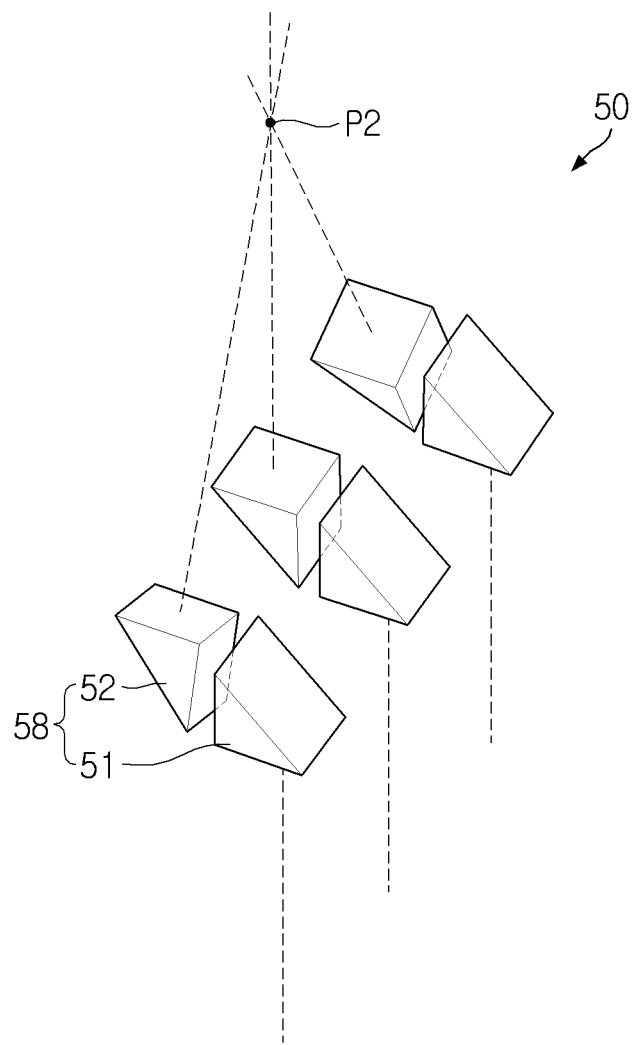
FIG. 13 is a view showing an optical system, according to still another embodiment of the present invention.
Figure 14:
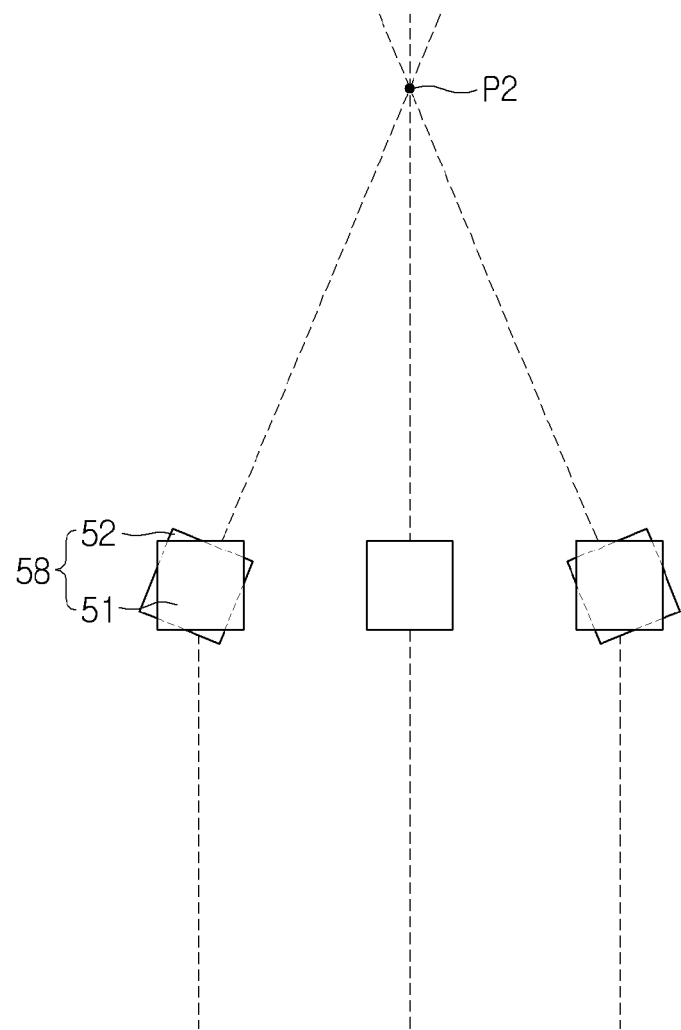
FIG. 14 is a plan view illustrating the optical system of FIG. 13.

FIG. 13 is a view showing an optical system 50, according to yet another embodiment of the present invention. FIG. 14 is a plan view of the optical system 50 of FIG. 13.

Referring to FIGS. 13 and 14, the optical system 50 according to this embodiment of the present invention includes a sub-system (a first sub-system) which is provided with only a single light deflection module 58. The light deflection module 58 includes right angle prisms 51 and 52 which are respectively disposed at front and rear positions or at left and right positions on a predetermined mechanical element. The residual construction of the optical system 50 is similar to that of the embodiment of FIG. 1 that includes the prisms 13, 14 and 15. The operation principle of the optical system 50 is the same as illustrated in FIG. 1.

In a manner similar to that of FIG. 11, although the first sub-system of this embodiment includes the single light deflection module 58, it can be made to adjust the path of light such that regardless of the variation in the distance that a ray of light which is transmitted from the sample travels to reach the light deflection module 58 which depends on the variation in the position of a portion of the sample to be observed, an incident ray of light which enters the light deflection module 58 from the sample in a direction parallel to a fixed axis (e.g. when the first prism 51 of the light deflection module 58 is positioned at the center of the lateral movement range, the fixed axis connects the sample to the center of the first prism 51 of the light deflection module 58) can be transmitted to the same single point P2. For instance, when the objective moves to the left or right, the positions of the right angle prisms 51 and 52 that are provided on the mechanical element are varied so that the polar angle or azimuth angle is varied such that regardless of any variation in the position of a portion of the sample to be observed, the ray of light that comes from the sample is transmitted to the same point P2. Compensation for the length of the path of light, depending on the variation in the distance covered by a ray of light transmitted from the sample, is embodied by the operation of the prisms 13, 14 and 15 (refer to FIG. 1) which form the path of light such that the overall length of the path of light from the sample to the second sub-system 19 via the first sub-system provided with the light deflection module 58 is maintained constant.

As such, the optical system 50 is a modification of the optical system 30 of FIG. 9. For example, although the orientation of the second prism 52 can be the same as that of the second prism 32 of FIG. 9, the first prism 51 is oriented such that the bottom thereof is parallel to an observation surface of the sample, unlike the orientation of the first prism 31 of FIG. 9. In a manner similar to the embodiment of FIG. 11, when the position of a portion of the sample to be observed is varied without varying the angle of an incident ray of light, incident ray of lights of light are transmitted to the same point regardless of the positions of the incident ray of lights of light. When the optical system 50 of this embodiment is used in an observation device such as a microscope, it also enables the observer to obtain images of a sample or other optical information within a predetermined range without shifting the position of the observer. If the optical system 50 is used in a light emitting device, light can be applied onto a portion of the sample within a predetermined range without shifting a light source or the sample.

FIG. 15 illustrates an example of a mechanical device embodied by the optical system 60 of the present invention.

As shown in FIG. 15, a first light deflection module 61 (that corresponds to the first light deflection module of FIG. 1) is coupled to an objective of the mechanical device so that it can integrally move along with the objective. A second light deflection module 62 (that corresponds to the second light deflection module of FIG. 1) is coupled to the first light deflection module 61 by a shaft that is able to move vertically in the same manner as that of a piston. As such, the first light deflection module 61 and the second light deflection module 62 which constitute a first sub-system 68 (that corresponds to the first sub-system of FIG. 1) are provided between two plates.

A first prism 63 (that corresponds to the first prism of FIG. 1) and a third prism 65 (that corresponds to the third prism of FIG. 1) are provided between upper portions of the two plates. A second prism 64 (that corresponds to the second prism of FIG. 1) is provided outside the plates so as to be movable relative to the first prism 63 and the third prism 65. The prisms 63, 64 and 65 of a second sub-system 69 (that corresponds to the second sub-system of FIG. 1) are moved such that when the first light deflection module 61 and the second light deflection module 62 move, the length of the entire path of light is maintained constant. Light which comes out of the third prism 65 passes through an eyepiece so that an observer can observe a sample.

If the first light deflection module 61 and the objective move based on the focus of the objective to the left or the right along guide grooves or slots which are formed in the side plates, the second light deflection module 62 and the first prism 63 which are connected to the first light deflection module 61 move in unison with it. The second prism 64 also moves along a predetermined groove in a scope tube and varies the distance between it and the corresponding side plate so that the total optical length can be maintained constant. Light that comes out of the third prism 65 is transmitted to the eyepiece module.

Referring to FIG. 15, the two plates are provided in an annular body so as to be rotatable rather than being fixed therein. Therefore, not only can the first light deflection module 61 and the objective move based on the focus of the objective to the left or right along the guide grooves or slots formed in the side plates but the first sub-system 68 and the second sub-system 69 can also rotate around the focus. Thereby, the angle at which the sample is observed or light is applied can be adjusted to various angles.

In FIG. 15, the first light deflection module 61, the second light deflection module 62, the first sub-system 68, the first prism 63, the second prism 64, the third prism 65 and the second sub-system 69 respectively correspond to the first light deflection module 11, the second light deflection module 12, the first sub-system 18, the first prism 13, the second prism 14, the third prism 15 and the second sub-system 19 in FIG. 1. The mechanical device of FIG. 15 to which the optical system of the present invention is applied is only a sample application of the optical system provided to serve as an example, so that the application of the present invention is not limited to this. In other words, the mechanical device can be modified in a variety of ways, so long as the operation of the optical system that has been illustrated with reference to FIGS. 1 through 8 can be embodied.

Figure 16:
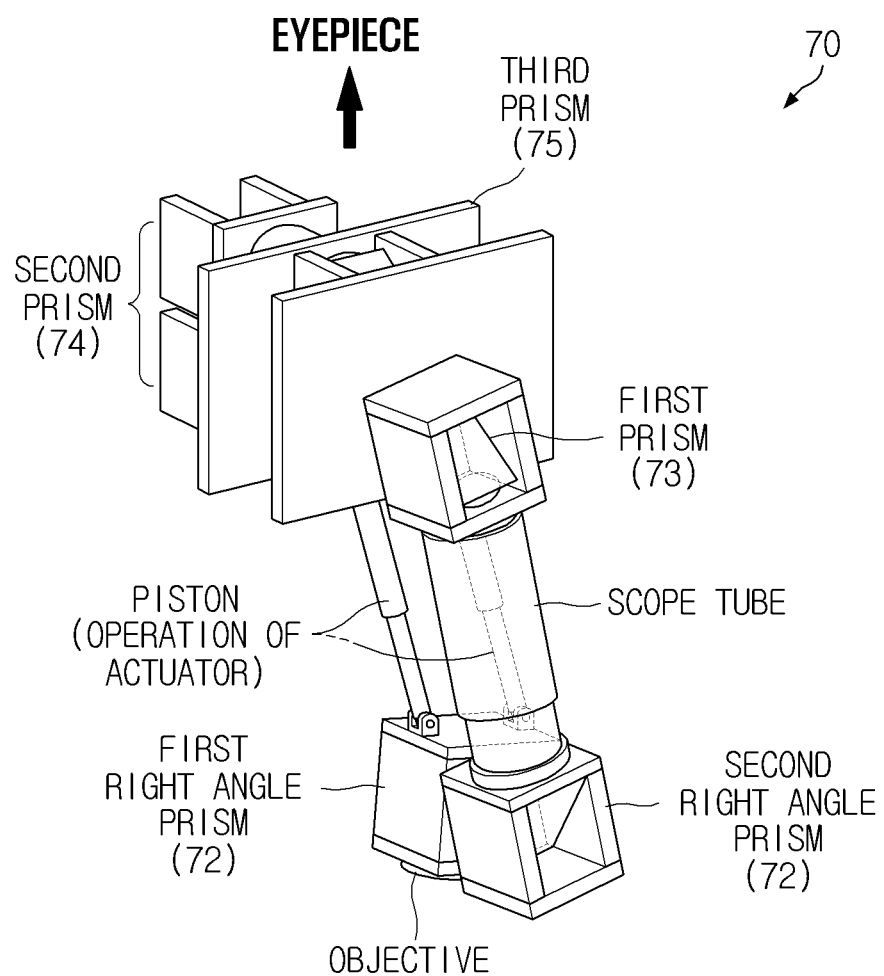
FIG. 16 illustrates another example of a mechanical device embodied by the optical system of the present invention.

FIG. 16 illustrates another example of a mechanical device embodied by the optical system 70 of the present invention.

As shown in FIG. 16, a first right angle prism 71 (that corresponds to the right angle prism 31 of the FIG. 9 or the right angle prism 51 of FIG. 13) is coupled to an objective of the mechanical device so that it can integrally move along with the objective. A second right angle prism 72 (that corresponds to the right angle prism 32 of FIG. 9 or the right angle prism 52 of FIG. 13) is coupled to the first right angle prism 71 by a predetermined coupling means so as to be movable along with the first right angle prism 71. The first right angle prism 71 is mounted to the mechanical device such that as the first right angle prism 71 moves to the left or the right to the angle or position at which to observe the sample, the polar or azimuth angle thereof is varied by pistons that are operated by actuators (not shown). The second right angle prism 72 that is coupled to the first right angle prism 71 by the coupling means defines the path of light such that light received from the sample is transmitted to the same single point P2 according to the principle illustrated in FIG. 9 or 13. The actuators such as motors which are provided to operate the pistons are disposed at appropriate positions in the vacant space of the optical system 70.

Prisms 73, 74 and 75 of a second sub-system (that corresponds to the second sub-system of FIG. 1) can be appropriately moved such that when the first right angle prism 71 and the second right angle prism 72 move, the total length of the path of light stays constant. Light that is transmitted from the second right angle prism 72 through a scope tube is reflected by the oblique plane of the first prism 73 before entering the second prism 74. Light that is applied onto the oblique side of the second prism 74 is sequentially reflected by the right-angled sides of the second prism 74 and then transmitted to the third prism 75. Light that is reflected by the oblique side of the third prism 75 comes out through the eyepiece to allow the observer to observe the sample.

The mechanical device of FIG. 16 to which the optical system of the present invention is applied is only another example given of the application of the optical system, so that the application of the present invention is not limited to this. In other words, the mechanical device can be modified in a variety of ways, so long as the operation of the optical system that has been illustrated with reference to FIGS. 9 through 14 can be embodied.

Figure 17:
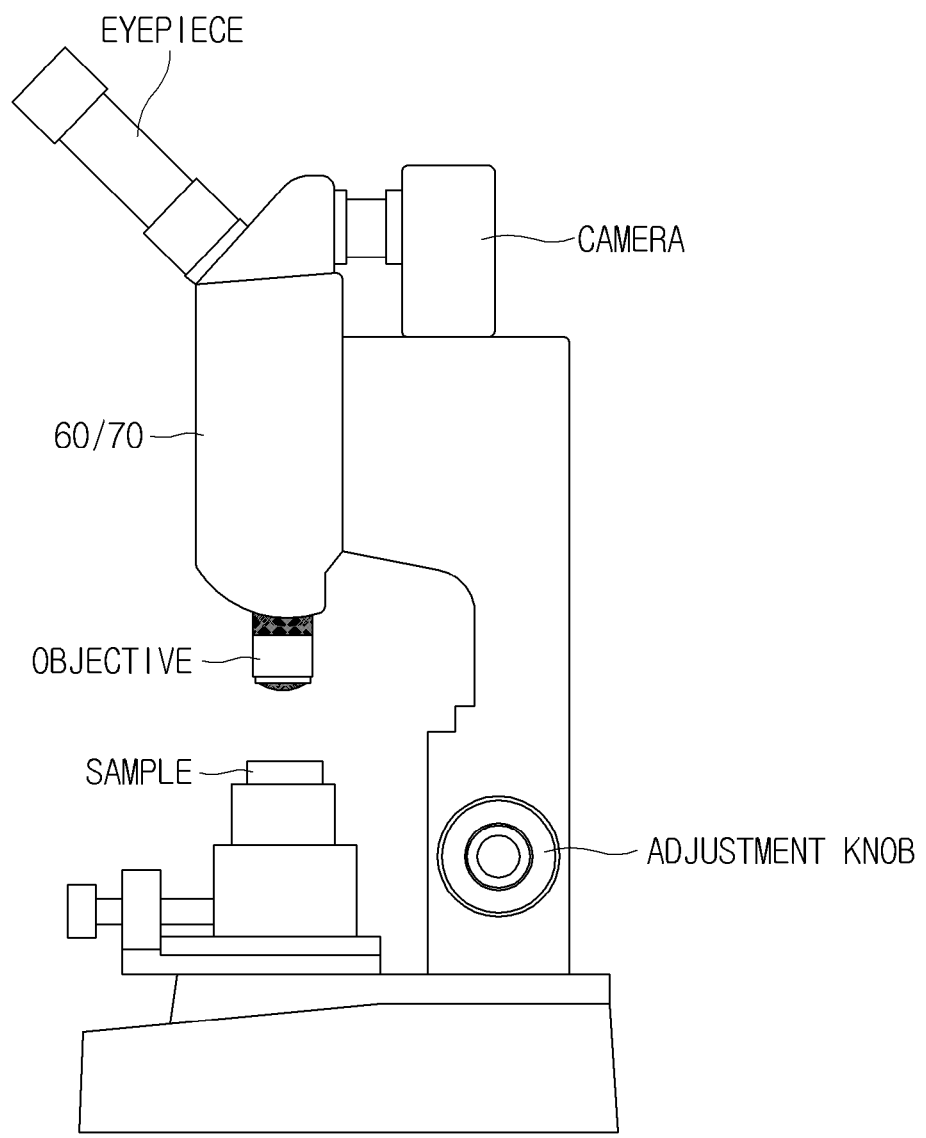
FIG. 17 is a view showing an example of a microscope to which the optical system of the present invention is applied.

FIG. 17 is a view showing an example of a microscope to which the optical system of the present invention is applied. As shown in FIG. 17, the optical system 60 of FIG. 15 or the optical system 70 of FIG. 16 can be provided between an eyepiece and a sample stage of the microscope. As an observer rotates an adjustment knob, the position of an objective can be moved to the left or right. Thereby, the angle of an incident ray of light transmitted from a sample can be varied. As the angle of an incident ray of light transmitted from the sample varies, the prisms 61, 62 and 63/71, 72 and 73 of the light deflection modules 61 and 62/71 and 72 of the optical system 60/70 are operated as stated above so that the observer can observe the front, rear, left and right sides of the sample through the objective without shifting the position of the eyes. Furthermore, an image that passes through the prisms 61, 62 and 63/71, 72 and 73 may be captured by a camera equipped with a predetermined lens. The camera may produce a digital image signal about the corresponding image and store it in a storage means. Although it is not shown in the drawings, the corresponding image may be displayed on a display.

Figure 18:
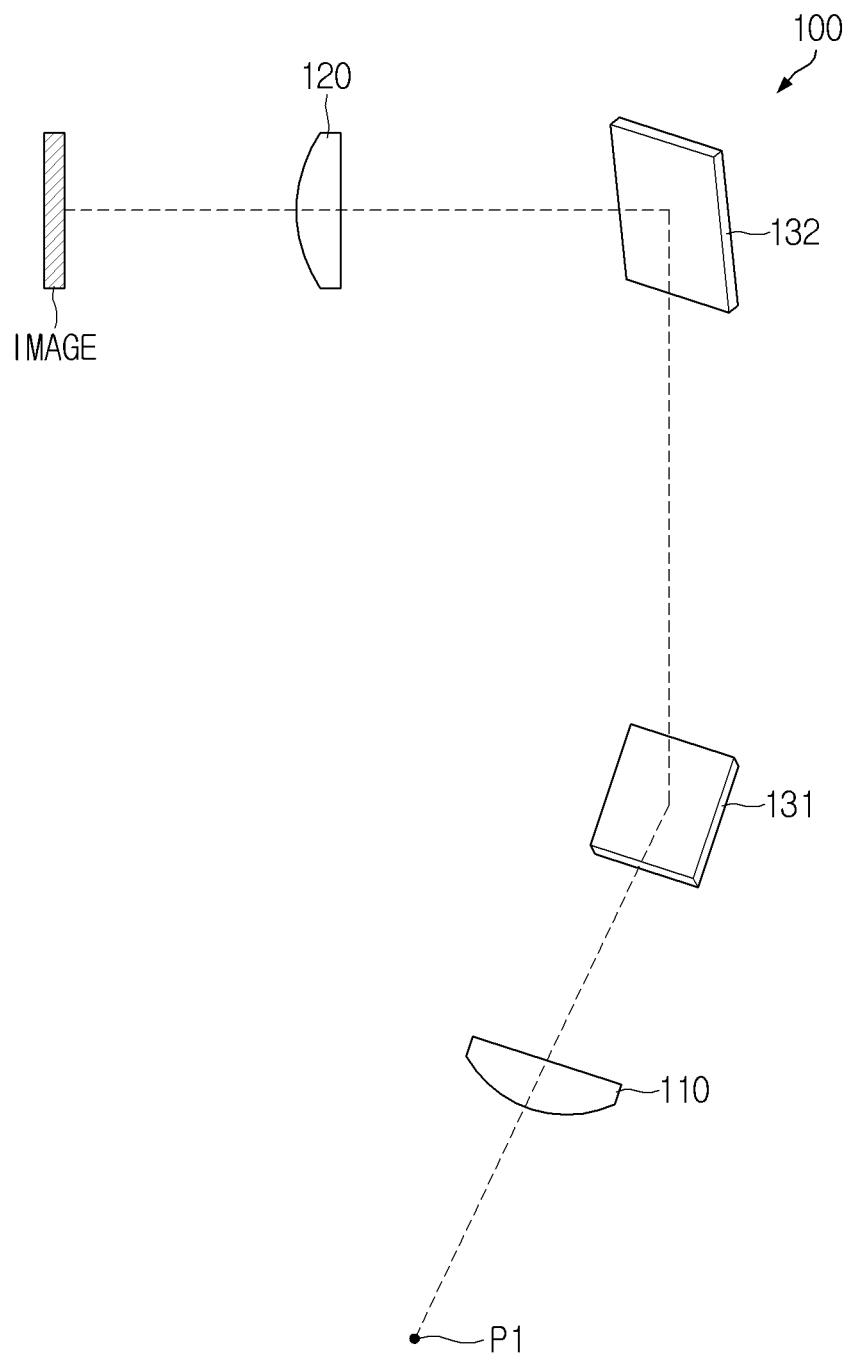
FIG. 18 is a view illustrating an optical system, according to still another embodiment of the present invention.

FIG. 18 is a view illustrating an optical system 100, according to still another embodiment of the present invention.

Referring to FIG. 18, the optical system 100 according to this embodiment includes a first lens 110 and a second lens 120. The optical system 100 may further include at least one mirror or prism, such as a wedge prism. FIG. 18 illustrates the case where two mirrors 131 and 132 are provided.

The first lens 110 is disposed at a position spaced apart from the position P1 of a sample or an object by the focal distance of the first lens 110. The first lens 110 may include a combination of lenses, prisms, or mirrors. The second lens 120 is spaced apart from the first lens 110 by a predetermined distance. The second lens 120 may include a combination of lenses, prisms, or mirrors.

Thus, collimated light rays can be formed between the first lens 110 and the second lens 120. If a center axis of the second lens 120 is formed adjacent to and parallel to a center axis of the first lens 110, collimated light rays can be transmitted between the first lens 110 and the second lens 120 so that the mirrors 131 and 132 are not required. However, as shown in FIG. 18, if the center axis of the lens are neither aligned with each other nor are parallel to each other, the mirrors 131 and 132 are used so that collimated light rays (or quasi-collimated light rays close to collimated light rays) can be transmitted between the first lens 110 and the second lens 120. Although it is not shown in the drawings, prisms such as wedge prisms, which refract a ray of light, may be used in lieu of the mirrors 131 and 132 which reflect a ray of light. Alternatively, a mirror and a wedge prism may be combined with each other. If the optical system of this embodiment is used in an optical device such as a microscope, collimated light rays are transmitted from the first lens 110 to the second lens 120. If it is used in a light emitting device such as a laser, collimated light rays are transmitted from the second lens 120 to the first lens 110.

The optical system 100 of this embodiment can also adjust the angle of the first lens 110 to the sample, at which the sample is observed or light is applied onto a sample, even without shifting an observer who is observing the sample or a light source of the light emitting device which is applying light onto the sample. Hence, the observer can observe the sample at various angles, or the light emitting device can apply light onto the sample at various angles. For instance, even though the second lens 120 is fixed, multi-angle images of the sample can be formed at the focus of the second lens 120 by appropriately adjusting the angle of the first lens 110 to the sample and the orientations of the mirrors 131 and 132. Alternatively, the light source of the light emitting device may be placed at the focal distance of the second lens 120 so that light can be applied onto the sample at various angles. In the case of a microscope, the first lens 110 refers to an objective, and the second lens 120 corresponds to a lens which transmits light to an eyepiece.

Figure 19:
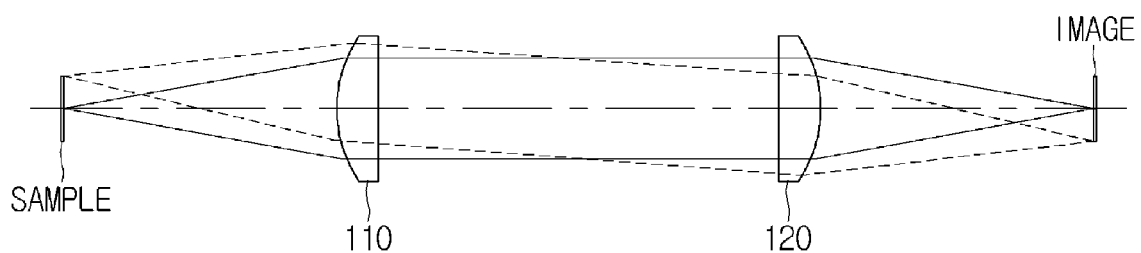
FIG. 19 is a view illustrating the principle of the optical system of FIG. 18.

FIG. 19 is a view illustrating the principle of the optical system 100 of FIG. 18. For example, the two lenses 110 and 120 may be lenses or cemented lenses that have the same focal distance. Rays of light that come out of the sample that is placed at the focal distance of the first lens 110 are changed into collimated light rays by the first lens 110, and then the collimated light rays pass through the second lens 120 and form an image on the focus of the second lens 120. Here, regardless of the length of the infinity space which is defined between the first lens 110 and the second lens 120 and where collimated light rays are present, an image of a certain size forms on the focus of the second lens 120. The example in which the two lenses 110 and 120 have the same focal distance to form a bilaterally symmetric structure is illustrated in FIG. 19. However, even if the optical system has an asymmetric structure, for example, in which the focal distances of the two lenses 110 and 120 are different from each other, or an additional optical element is provided along the path of the light, the same principle as that of FIG. 19 can be applied, so long as a portion that can vary the length of the path of light is subject to the space where collimated light rays are present. It is well known that in the case of the symmetric structure, although there may be restrictions in terms of design, it remains true that coma aberration, distortion aberration and later chromatic aberration can be completely eliminated in theory, and even if the structure of the lenses is not symmetrical, the closer it approximates a symmetric structure, there is more of a reduction in the increase that takes place in the three kinds of aberrations.

Figure 20:
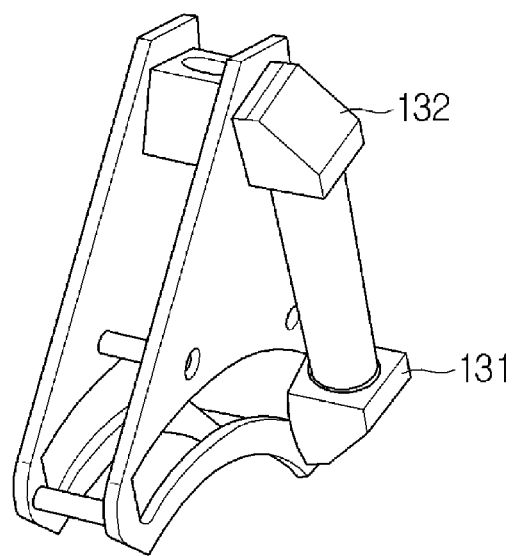
FIG. 20 is a perspective view showing an example of a mechanical device embodied by the optical system of FIG. 18.

FIG. 20 is a perspective view showing an example of a mechanical device embodied by the optical system 100 of FIG. 18. The appearance of this optical system 100 may be that of FIG. 24. The first lens 110 can move to the left or the right so that the polar or azimuth angle thereof varies. As shown in FIG. 20, mirrors 131 and 132 are coupled to the first lens 110 and mounted to the mechanical device such that the positions of the mirrors 131 and 132 are varied depending on the variation in the angle of the first lens 110 to a sample that results from variation in the position of the first lens 110. The mirrors 131 and 132 function to change the path of collimated light rays between the first lens 110 and the second lens 120.

Figure 21:
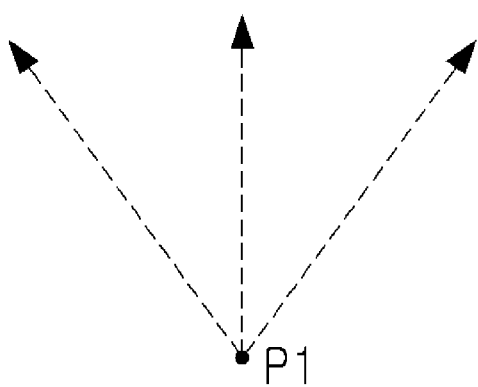
FIG. 21 is a view illustrating a multi-angled observation (or light application) of the optical system of FIG. 18.
Figure 22:
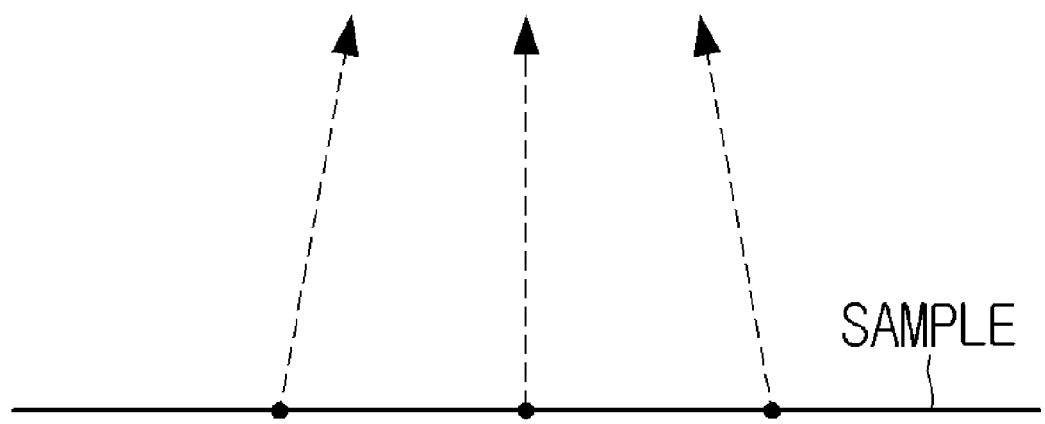
FIG. 22 is a view illustrating variation in the position of an objective of the optical system of FIG. 18.

Therefore, even though the second lens 120 is fixed, as shown in FIG. 21, when the angle of the first lens 110 to the sample is varied, multi-angle images of the sample can be formed on the focus of the second lens 120 by appropriately operating the mirrors 131 and 132. Furthermore, as shown in FIG. 22, the mechanical device may be configured such that as the position of the first lens 110 is shifted, the position of a portion of the sample to be observed can be changed. At each position, multi-position images may be formed on the focus of the second lens 120.

In the same manner, even when a light source of a light emitting device is disposed at a position corresponding to the focus of the second lens 120 so that light is applied onto a sample, as shown in FIG. 21, light can be applied onto the sample at various angles, and as shown in FIG. 22, as the position of the first lens 110 can be shifted, light can be applied onto each of several portions of the sample at various position.

Figure 23:
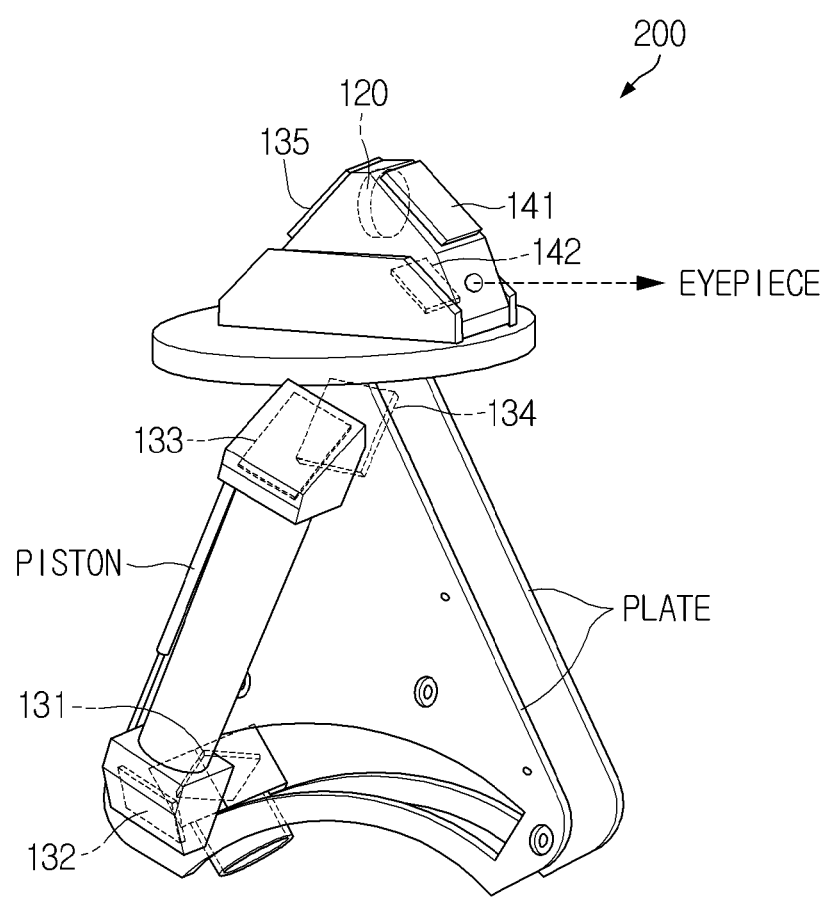
FIG. 23 is a view illustrating an optical system, according to still another embodiment of the present invention.

FIG. 23 is a view illustrating an optical system 200, according to still another embodiment of the present invention. The appearance of this optical system 200 of this embodiment may be that of FIG. 24. As shown in FIG. 23, the optical system 200 includes five mirrors 131 to 135 which are provided between a first lens 110 and a second lens 120.

For example, the first lens 110 can move to the left or the right along an arc-shaped guide groove or slot so that the polar or azimuth angle thereof varies. The mirrors 131 to 133 are coupled to the first lens 110 and mounted to the mechanical device such that the positions of the mirrors 131 to 134 are varied depending on the variation in the angle of the first lens 110 to a sample that results from a variation in the position of the first lens 110. Collimated light rays that come out of the mirrors 131 to 133 are reflected by the fixed mirrors 134, 135 towards the second lens 120. As such, the mirrors 131 to 135 function to change the path of collimated light rays between the first lens 110 and the second lens 120. The path of light that has passed through the second lens 120 is changed by fixed mirrors or prisms 141 and 142 so that the light is transmitted to an eyepiece through a predetermined hole. The eyepiece is disposed at a position corresponding to the focus of the second lens 120 and transmits collimated light rays or quasi-collimated light rays to the eyes of the observer.

As shown in FIG. 24, as a handle which protrudes outwards from the body of the mechanical device is moved, the first lens 110 which is coupled to the handle is moved along the arc-shaped guide groove or slot so that the polar or azimuth angle thereof can be varied. Also, the positions or orientations of the mirrors 131, 132, and 133 which are coupled to the first lens 110 are varied.

In other words, while the first lens 110 moves along the arc-shaped guide groove or slot, the first mirror 131 moves to adapt to a variation in the polar or azimuth angle of the first lens 110 so that the path of collimated light rays that come out of the first lens 110 can be appropriately varied. The mirrors 132 to 133 also move in response to variation in the angle of the first mirror 131 so that collimated light rays reflected by the first mirror 131 are transmitted to the fixed mirrors 134, 135. Collimated light rays that are reflected by the mirror 135 are ultimately transmitted to the second lens 120 such that the rays are parallel to the center axis of the second lens 120. Here, the force by which the first lens 110 is moved may be force which is applied from the observer to the handle. In response to the movement of the first lens 110, actuators or the like are operated, thus actuating corresponding pistons. This interlocks the mirrors 131 to 133 coupled to the pistons with the first lens 110.

In a manner similar to the embodiment of FIG. 15, the optical system 200 may also be provided in an annular body so as to be rotatable. Therefore, not only can the objective 110 be moved to the left or right along guide grooves or slots formed in side plates while the mirrors 131 to 133 move in response to the movement of the objective 110, but the objective 110 can also rotate inside the annular body while the mirrors 131 to 133 move to adapt to a variation in the position of the objective 110. Therefore, the angle at which the sample is observed or light is applied onto the sample can be adjusted to a wider variety of values.

As described above, in the present invention, an objective can be tilted within a predetermined range of polar angle and rotated by a predetermined azimuth angle. Light that passes through the objective is controlled by an optical module such that the optical path length can be maintained constant, or such that collimated light rays are present in a portion that can be varied in length so that an image can be formed at a certain position. A fixed eyepiece magnifies/reduces the image and transmits it to the eyes of an observer. In the above-mentioned embodiments, although only a mirror and/or right angle prism have been illustrated as being used, different kinds of prisms may be actually used to compensate for inversion or rotation of an image. In an optical or stereoscopic microscope rather than a digital microscope, an oblique path of light can be formed by the optical system so that even without shifting a sample or the position of the eyes of the observer who is using the microscope, not only can the observer observe the vertical plan view of the sample but he/she can also observe a front, rear, left or right side of the sample at an arbitrarily oblique angle or can also observe the sample in a manner of rotation around the vertical axis. Therefore, the observer can observe the sample in three dimensions. Because the observer is not required to move, he/she can conveniently and stably process an object (or manufacture or repair an electronic part, machine or inspect a fine object, or perform microsurgery), and the degree of fatigue of the observer or operator can be reduced. Furthermore, when necessary, the observer may observe the sample while varying the position of a portion of the sample to be observed even without shifting the sample or the position of the eyes of the observer. The principle of the optical system of the present invention can be applied not only to an optical microscope or stereoscopic microscope but also to an optical device such as a telescope, a periscope, or an endoscope. Moreover, the principle of the present invention can be applied to an optical system of a light emitting device which is used to apply light onto a sample. Even when the present invention is applied to the light emitting device, light can be applied onto the sample not only in the vertical direction but also in an oblique direction within a predetermined angular range based on the vertical axis without moving the sample or a light source of the light emitting device. Furthermore, light can be applied onto the sample while rotating around the vertical axis.

While the preferred embodiments of the present invention have been disclosed for illustrative purposes, the present invention is not limited to the embodiments or drawings disclosed in this specification, and those skilled in the art will appreciate that various modifications, additions and substitutions are possible. Therefore, the scope of the invention must be defined by the appended claims and equivalence of the claims rather than by the description preceding them.

What is claimed is:

1. An optical system capable of observing an object at different angles or positions without movement of an object and an observer, comprising:
    a first sub-system forming a first light path from a first point to a second point; and
    a second sub-system forming a second light path from the second point to a third point,
        wherein the first sub-system is configurable such that the light from the first point traveling at a first polar angle with respect to a fixed axis, which is defined by a perpendicular line between the first point to the second point, is transmitted to the second point at a second polar angle,
        wherein the second sub-system is configured to adjust a length of the second light path in response to a change in a length of the first light path in the first sub-system such that a combined length of the first light path and second light path remains constant,
        wherein the first sub-system includes a first lens for forming collimated light rays from the light entering the first sub-system from the first point, the first lens being configurable in a tilted orientation with respect to the fixed axis so that the light from the first point passing through the first lens travels in the first polar angle with respect to the fixed axis,
        wherein the optical system is configured as a microscope to observe the object in such a way that the light from the object sequentially passes through the first lens, the first sub-system, the second sub-system and a second lens, in which the first lens is an objective that is capable of being tilted within a predetermined range of polar angles relative to the fixed axis and rotatably positioned about the fixed axis in a predetermined azimuth angle.

2. The optical system according to claim 1, wherein the first sub-system comprises:
    a first light deflection module that adjusts the first light path such that the collimated light rays entering the first light deflection module at the first polar angle with respect to the fixed axis exits the first light deflection module in a direction that is parallel to the fixed axis; and
    a second light deflection module that adjusts the first light path such that the collimated light rays passed through the first light deflection module to travel in the second polar angle with respect to the fixed axis so that the collimated light rays reach the second point.

3. The optical system according to claim 2, wherein each of the first light deflection and the second light deflection module comprises two wedge prisms, each one of the wedge prisms being configured to adjust its orientation and position in a predetermined range of polar angles and a predetermined range of azimuth angles relative to the fixed axis based on an angle of the light incident at the wedge prisms.

4. The optical system according to claim 2, wherein each of the first light deflection and the second light deflection module comprises two right angle prisms, each one of the right angle prisms being configured to adjust its orientation and position in a predetermined range of polar angles and a predetermined range of azimuth angles relative to the fixed axis based on an angle of the light incident at the right angle prisms.

5. An optical system capable of observing an object at different angles or positions without movement of an object and an observer, comprising:

a first sub-system forming a first light path from a first point to a second point; and a second sub-system forming a second light path from the second point to a third point, wherein the first sub-system is configurable such that the light from the first point traveling at a first polar angle with respect to a fixed axis, which is defined by a perpendicular line between the first point to the second point, is transmitted to the second point at a second polar angle, wherein the second sub-system is configured to adjust a length of the second light path in response to a change in a length of the first light path in the first sub-system such that a combined length of the first light path and second light path remains constant, wherein the first sub-system comprises a light deflection module including at least two right angle prisms to form the first light path within the first sub-system, each one of the right angle prisms being configurable in a predetermined range of polar angles and a predetermine range of azimuth angles relative to the fixed axis in response to changes in a position and an orientation of a first lens coupled to the first sub-system.

6. An optical system capable of observing an object at different angles or positions without movement of an object and an observer, comprising:

a first sub-system forming a first light path from a first point to a second point; and a second sub-system forming a second light path from the second point to a third point, wherein the first sub-system is configurable such that the light from the first point traveling at a first polar angle with respect to a fixed axis, which is defined by a perpendicular line between the first point to the second point, is transmitted to the second point at a second polar angle, wherein the second sub-system is configured to adjust a length of the second light path in response to a change in a length of the first light path in the first sub-system such that a combined length of the first light path and second light path remains constant, wherein the first sub-system includes a first lens for forming collimated light rays from the light entering the first sub-system from the first point, the first lens being configurable in a tilted orientation with respect to the fixed axis so that the light from the first point passing through the first lens travels in the first polar angle with respect to the fixed axis, wherein the second sub-system comprises:

a first prism, a second prism and a third prism that sequentially change the path of the incident ray of light, wherein the second sub-system is configured such that at least one of a distance between the second prism and the first prism and a distance between the second prism and the third prism is adjusted to compensate for the change in a length of the first light path caused by changes in the tilted orientation of the first lens relative to the fixed axis.

7. An optical system for observing an object by using light coming from the object without moving the object, comprising:

a first optical unit having a first lens disposed at a position spaced apart from the object by a focal distance of the first lens, a second lens provided at a position spaced apart from the first lens by a predetermined distance, wherein the first lens being configured to move along a guide provided in a base of the optical system to allow the first lens to be positioned in a tilted orientation relative to a normal axis from an observation surface of the object towards the second lens such that collimated light rays are formed in a space between the first lens and the second lens; and at least one light path changing unit configured to change its orientation in response to the movement of the first lens, such that a path of the collimated light rays is directed to the second lens is changed by said at least one light path changing unit.

8. The optical system according to claim 7, wherein an image of the object is formed at a focus of the second lens.

9. The optical system according to claim 7, wherein the light path changing unit comprises a mirror or prism.

10. The optical system according to claim 7, wherein the base has an annular shape with the guide being provided along a side plate of the annular shaped base to allow the first lens to be positioned rotatably about the perpendicular axis.

11. The optical system according to claim 10, wherein the first optical system includes a first light deflection module configured to integrally move along with the first lens and a second light deflection module that is coupled to the first light deflection module by a shaft, such that, when the first light deflection module and the first lens move along the guide groove, the second light deflection module moves in unison with the first light deflection module.

* * * * *